US012348180B1

United States Patent
Bortone

(10) Patent No.: US 12,348,180 B1
(45) Date of Patent: Jul. 1, 2025

(54) OVERHEAD TENSILE-ACTUATED SOLAR TRACKING SYSTEM AND METHOD

(71) Applicant: Dante Stephen Bortone, Durham, NC (US)

(72) Inventor: Dante Stephen Bortone, Durham, NC (US)

( * ) Notice: Subject to any disclaimer, the term of this patent is extended or adjusted under 35 U.S.C. 154(b) by 0 days.

(21) Appl. No.: 18/978,716

(22) Filed: Dec. 12, 2024

Related U.S. Application Data

(60) Provisional application No. 63/609,710, filed on Dec. 13, 2023.

(51) Int. Cl.
  *H02S 20/32* (2014.01)
  *F24S 30/45* (2018.01)
  *F24S 30/00* (2018.01)

(52) U.S. Cl.
  CPC .............. *H02S 20/32* (2014.12); *F24S 30/45* (2018.05); *F24S 2030/133* (2018.05)

(58) Field of Classification Search
  None
  See application file for complete search history.

(56) References Cited

U.S. PATENT DOCUMENTS

| | | | |
|---|---|---|---|
| 6,302,099 B1 * | 10/2001 | McDermott | F24S 30/45 126/696 |
| 8,528,541 B2 | 9/2013 | Olsson et al. | |
| 10,630,230 B2 | 4/2020 | Luo | |
| 2013/0000693 A1 * | 1/2013 | Waterhouse | F24S 25/13 136/246 |
| 2014/0076480 A1 * | 3/2014 | Kalus | F24S 23/74 156/91 |
| 2014/0261632 A1 * | 9/2014 | Clavelle | H02S 20/32 136/246 |
| 2014/0338659 A1 * | 11/2014 | Corio | F24S 30/428 126/714 |
| 2021/0336579 A1 | 10/2021 | Sun | |

FOREIGN PATENT DOCUMENTS

| | | |
|---|---|---|
| CN | 114301381 | 4/2022 |
| CN | 217070783 | 7/2022 |

OTHER PUBLICATIONS

PCT Search Report.
PCT Written Opinion.

* cited by examiner

*Primary Examiner* — Steven M Marsh
(74) *Attorney, Agent, or Firm* — Ashley D. Johnson; Dogwood Patent and Trademark Law

(57) ABSTRACT

The invention is a system and method of harvesting solar energy. The system includes a dual axis tracking system configured to manually or automatically adjust the orientation of one or more solar collectors relative to the movement of the sun to optimize energy harvesting. The system actuates solar collector movement through tensile elements that are manipulated from an overhead position. The overhead tensile actuation advantageously enables flexible installation options, including transforming residential homes, utility poles, lamp posts, and large buildings into solar farms.

19 Claims, 30 Drawing Sheets

OVERHEAD TENSILE-ACTUATED SOLAR TRACKING SYSTEM AND METHOD

CROSS-REFERENCE TO RELATED APPLICATIONS

This application claims priority to U.S. Provisional Patent Application No. 63/609,710, filed Dec. 13, 2023, the entire content of which is incorporated by reference herein.

TECHNICAL FIELD

The presently disclosed subject matter is directed to an overhead tensile-actuated solar tracking system. The presently disclosed subject matter further includes methods of making and using the solar tracking system.

BACKGROUND

Solar energy collection systems, such as photovoltaic panels, solar thermal systems, and heliostats have become increasingly popular due to their environmental benefits and decreasing costs. However, traditional fixed-position solar installations capture energy in a unidirectional manner, often leading to suboptimal energy harvesting. Existing tracking mechanisms aim to solve this by aligning the solar collecting surface with the sun's trajectory across the sky.

To elaborate, current tracking technologies typically utilize dual-axis or single-axis mechanical methods for actuation that employ ground-based (or "undermount") actuators. The actuators adjust the orientation of solar collectors about a central support structure from a location underneath the plane of the mounting panel. While such prior art systems are effective, there are many drawbacks. For example, the actuators often bear the full weight of the solar panel, necessitating more robust and costly motor systems. Additionally, the systems include a large footprint that is unsuitable for constrained spaces (e.g., residential areas). Furthermore, the undermounted support and actuators block ambient and reflected light from reaching the underside of the panel, limiting the benefits that could be obtained from bifacial solar collectors. In addition, traditional systems are often standalone units that require dedicated land, which can be a significant expense. Often, standard dual axis and fixed-position solar collectors are difficult to remove. During storms these unsecured panels not only incur, but also cause damage. Furthermore, potential buyers of solar systems are dissuaded from investing in a system that they cannot relocate when they move residences.

It would therefore be beneficial to provide a solar tracking system and method that overcomes the shortcomings of the prior art.

SUMMARY

In some embodiments, the presently disclosed subject matter is directed to a system for manipulating a solar collector through overhead tensile actuation. Particularly, the system comprises a vertical structure for support and a supporting panel mount or supporting frame to hold the solar collector. The system also includes at least two tensile actuators configured to apply tensile force to the solar collector from above a plane of the solar collector. The system includes a supporting pivot to angle the solar collector, and a rotating central cylinder connected to the supporting pivot. The system comprises a control mechanism to manipulate the tensile actuators for rotational or angular movement of the solar collector.

In some embodiments, the solar collector is selected from the group comprising solar panels, heliostats, solar thermal collectors, and combinations thereof.

In some embodiments, the tensile actuators are selected from the group comprising: cables, chains, ropes, strings, cords, wires, lashings, tethers, and combinations thereof.

In some embodiments, the tensile actuators are wound using one or more winding mechanisms selected from winches, hoists, pulleys, ratchets, spools, and combinations thereof.

In some embodiments, the tensile actuators comprise hydraulic or pneumatic force.

In some embodiments, the rotating central cylinder or supporting pivot is arranged to rotate to allow the solar collector to track either diurnal motion or seasonal declination. "Diurnal motion" refers to the apparent motion of celestial objects (e.g., the sun) around the Earth (or around the two celestial poles) over the course of one day. "Seasonal declination" refers to the measurement of the angle between the sun's rays and the Earth's equatorial plane. The Earth's axis is tilted 23.5 degrees away from the solar plane, which causes the declination angle to vary seasonally. If the Earth were not tilted on its axis of rotation, the declination would always be 0 degrees.

In some embodiments, one or more attachments are positioned at any location along the solar collector, panel mount, or rotating central cylinder, provided that the vertical structure is not a centrally located structure under a plane of the panel mount and tensile force comes from above the plane of the panel mount.

In some embodiments, the central cylinder is positioned along a side of the panel mount.

In some embodiments, the tensile actuators are attached to the solar collector, the panel mount, an overhead attachment, a central shaft, the rotating central cylinder, the vertical support structure, or ground (e.g., walking surface).

In some embodiments, the system includes one or more rotational hinges, spacers, pulleys, eye screws, eye bolts, snatch blocks, springs, pivots, or bearing assemblies that allow the tensile actuators to align with a corresponding attachment.

In some embodiments, the system includes one or more elements to reduce back-drive of the tensile actuator, the one or more elements selected from one or more of integrated brakes, worm gears, gear boxes, or mechanical breaks. The term "worm gear" refers to a type of cylindrical gear with teeth that are cut at an angle to the axis of rotation, and a shaft with a spiral thread that engages with and drives a toothed wheel. One example of a worm gear is shown in FIG. 31. As illustrated the worm gear includes spool 200, pillow bearing 201, shaft gear coupler 202, gear 203, spool shaft 204, bearing 205, servo shaft 206, worm gear worm 207, servo cradle 208, shaft servo coupler 209, aluminum framing 210, and servo 211, as would be known in the art. A mechanical brake includes elements for the deceleration or stop of axes in equipment drives.

In some embodiments, the supporting pivot is raised and lowered by an additional tensile actuator (e.g., for maintenance, optimal positioning, or emergency scenarios such as high winds).

In some embodiments, the solar panel is rapidly detached at a point of a support attachment, the supporting pivot, or the central cylinder.

In some embodiments, the shaft is connected to any point or points along the supporting pivot.

In some embodiments, the supporting pivot or vertical structure comprise hinges or bearing assemblies.

In some embodiments, multiple systems are attached to the same vertical structure and share control boards, local power sources, GPS units, communication systems, pivots, shafts, positional sensors, tensile actuators, tensile elements, or combinations thereof.

In some embodiments, the rotating central cylinder, supporting pivot, or both comprise rotational bearings.

In some embodiments, a shaft of the rotating cylinder is attached to the panel mount with the rotating cylinder attached to the supporting pivot.

In some embodiments, a pivot pin is attached to the vertical structure with the rotating central cylinder attached to the pivot pin.

In some embodiments, the system includes a positioning sensor on the panel mount, an axle, an actuator, or a tensile element that provides feedback on the orientation of the solar collector, the positional sensor selected from one or more accelerometer, gyroscope, rotary encoder, or photodiode.

In some embodiments, the system includes a rapid stowing, lowering, or detaching mechanism activated during high-wind or other emergency scenarios. For example, unfavorable conditions could be detected by an anemometer or notified via WiFi and trigger the system to move to a horizontal position that reduces wind drag. In the case of hail the system could be tilted vertically. If equipped with a third actuator as shown in FIG. 5a, the entire panel could be further removed from harm by lowering as shown in FIG. 5b.

In some embodiments, the system includes one or more mechanisms for detecting potential collisions, wherein the mechanisms are selected from one or more of proximity sensors, preprogramed movement limits, detecting an excessing force on the tensile actuators, and physical restrictions to block collisions.

In some embodiments, one of the two tensile actuators is positioned below a plane of the panel mount such as below the vertical structure or ground, and the force is redirected via pulleys, levers, or other mechanisms to come from above the plane of the panel mount via mechanical implementations such as pulleys or levers. Thus, the presently disclosed subject matter can include an alternative function where the system redirects, collects, receives, or sends emissions to or from a natural object such as a celestial body or manmade object such as a satellite or weather balloon.

In some embodiments, the vertical structure rotates, adjusts, or both rotates and adjusts an angle of the vertical structure.

In some embodiments, the system includes a mechanism to extend and retract the tensile elements in tandem while keeping a top edge of the panel mount at a consistent angle using feedback mechanisms from actuators, accelerometers or rotary encoders to determine the correct amount of movement for each tensile element.

DETAILED DESCRIPTION

Figure 1:
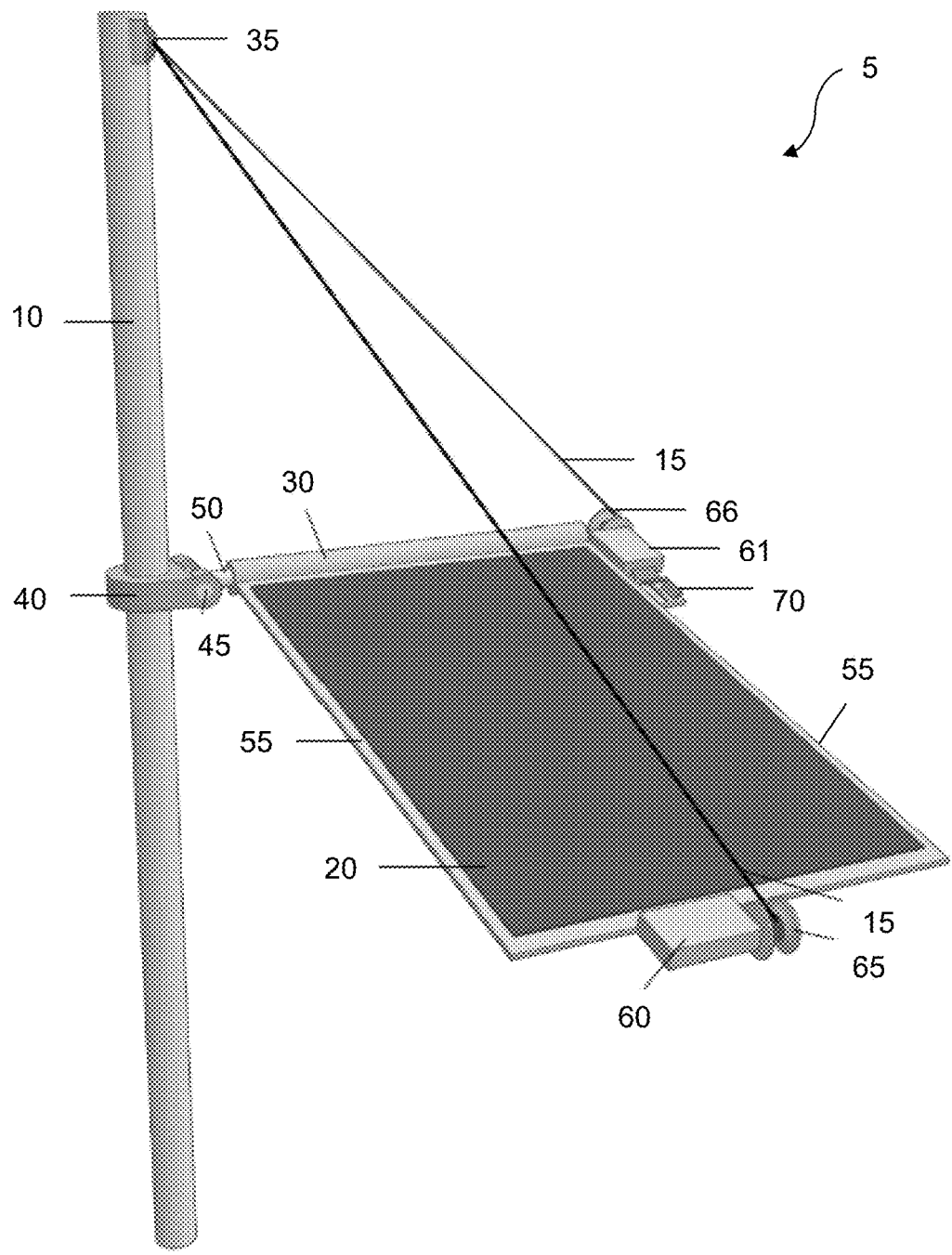
FIG. 1 is a perspective view of an overhead tensile-actuated solar tracking system in accordance with some embodiments of the presently disclosed subject matter.

The previous summary and the following detailed descriptions are to be read in view of the drawings, which illustrate some (but not all) embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−0.1-20% from the specified amount, as such variations are appropriate in the disclosed packages and methods.

The presently disclosed subject matter is generally directed to a system and method of harvesting solar energy. Solar energy includes the radiant energy (heat and light) produced by the sun. The radiant energy is harnessed to generate electricity, solar thermal energy (e.g., solar water heating), solar architecture, and the like. The term "solar energy harvesting" therefore refers to a process by which energy is derived from the sun and then stored for use, typically using one or more panels.

As described in detail below, the presently disclosed subject matter comprises a dual axis tracking system configured to manually or automatically adjust the orientation of one or more solar collectors relative to the movement of the sun (e.g., to optimize energy harvesting). The disclosed system actuates solar collector movement through tensile elements that are manipulated from an overhead position.

The overhead tensile actuation advantageously enables flexible installation options, including (but not limited to) transforming residential homes, utility poles, lamp posts, and large buildings into solar farms. The system tracks both diurnal (daytime) solar motion and seasonal declination and incorporates control mechanisms for precise orientation.

FIG. 1 illustrates one embodiment of solar tracking system 5 comprising vertical support 10 that provides a foundation for overhead tensile elements 15 that actuate movement of one or more solar-collecting elements 20 configured on a supporting panel mount or a supporting frame 55. As illustrated in FIG. 1, the solar collector frame 55 or solar collecting element 20 can be affixed to rotating cylinder 30 attached to supporting pivot 45, providing two degrees of freedom while leaving the underside of the collecting element unobstructed. The system also includes one or more control mechanisms (which can be any of a wide range of controllers) to manipulate the tensile actuators for rotational and/or angular movement of solar collecting element 20.

System 5 includes at least two tensile elements 15 connected to an actuating mechanism, such as a winch 60, 61 or spool 65, 66. The term "tensile elements" includes any strength component that can support the solar-collecting element. Suitable tensile elements can include (but are not limited to) one or more cables, chains, strings, cods, lashings, ropes, tethers, filaments, fibers, wires, and the like. The system can include any number of tensile elements, such as about 2-10 or more (e.g., at least/no more than about 2, 3, 4, 5, 6, 7, 8, 9, or 10). Actuating mechanism 60, 61 can rotate the spool 65, 66 to retract or extend the tensile elements, pulling on the overhead attachment 35 and enabling dynamic positioning of solar-collecting element 20 in alignment with the sun's diurnal or seasonal movements.

Solar collecting elements 20 can include photovoltaic panels (solar panels), solar thermal systems, and/or heliostat mirrors. Photovoltaic panels include any packaged and/or interconnected assembly of photovoltaic cells. Each photovoltaic cell can be configured as an electronic device that converts the energy of light/heat directly into electricity via the photovoltaic effect. For reasons of cost and practicality, several cells are typically connected electrically and packaged in a photovoltaic module, which typically includes the photovoltaic cells housed in a frame formed from aluminum or other weather-resistant materials and covered with glass. The glass panel allows transmission of light therethrough but protects the photovoltaic cells from the elements.

The term "heliostat" refers to a device with one or more mirrored facets configured to reflect sunlight to a solar receiver as a component of concentrated solar-thermal power technologies. A heliostat therefore includes several plane mirrors that turn along two axes and serve to direct the sun's rays that fall on them towards a specific direction. The main objective of the heliostat is to concentrate sunlight toward a predetermined target.

Solar thermal systems convert sunlight into heat and use the generated heat to produce electricity. Examples of solar thermal systems include (but are not limited to) solar power towers, parabolic trough systems, and dish-Stirling systems.

Figure 2:
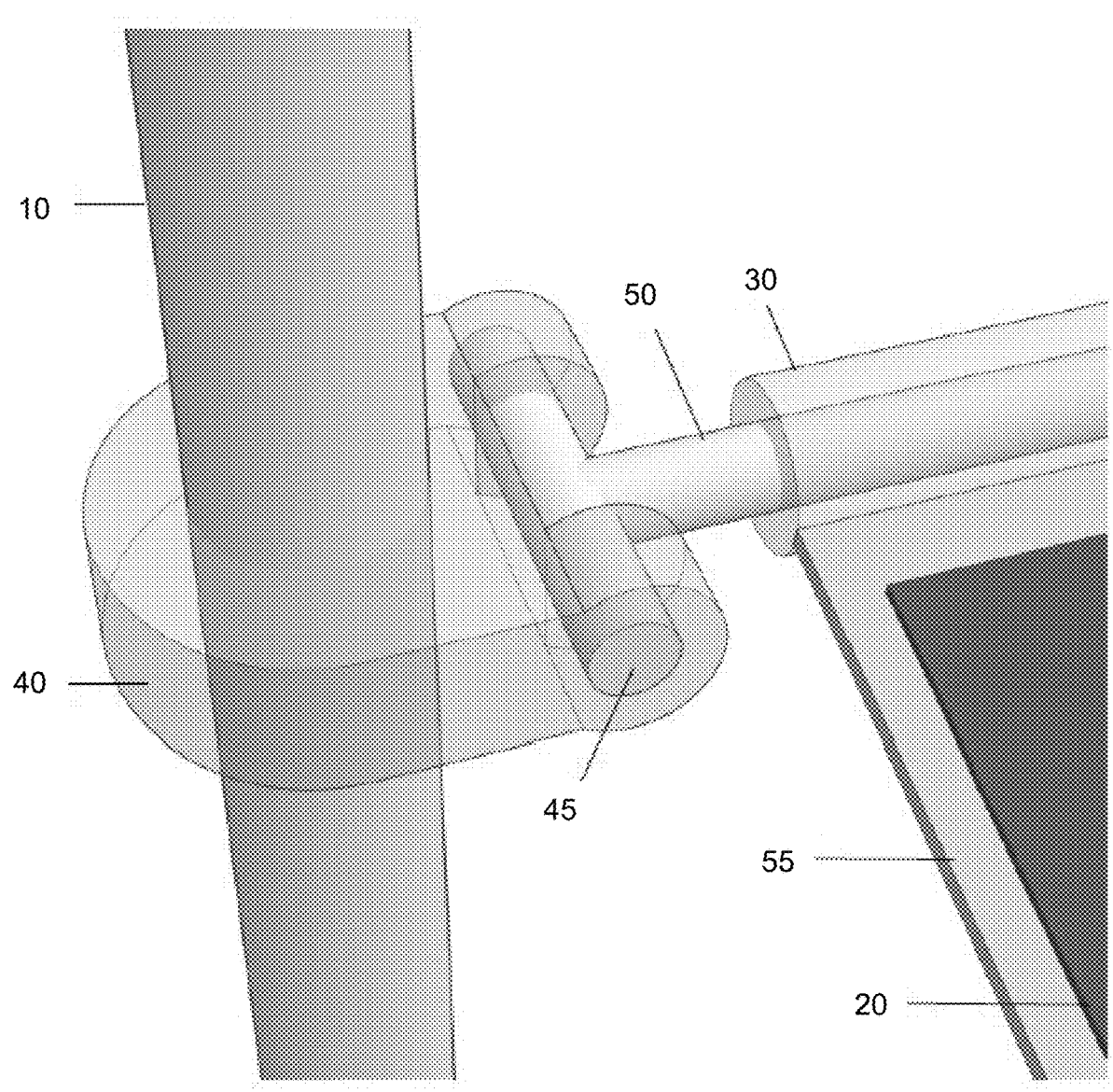
FIG. 2 is a fragmentary view of a system supporting pivot, rotating cylinder, and panel mount in accordance with some embodiments of the presently disclosed subject matter.

As shown in FIGS. 1 and 2, solar-collecting element 20 can be permanently or releasably attached to vertical support 10 via one or more attachments 40. Vertical support 10 can be any vertical supporting element such as (but not limited to) a pole or rod constructed from any desired material. The attachment includes supporting pivot 45 that enables rotation of the solar-collecting element panel mount or supporting frame 55 to track diurnal solar motion. The supporting frame or panel mount can be sized and shaped to reliably hold the solar collector in proper position when at rest and during rotation, as described below. Shaft 50 extends from the pivot, over which cylinder 30 rotates. Panel mount 55 connects to the cylinder, rotating to adapt to solar declination. The panel mount houses the solar collecting element for energy harvesting. The panel mount further attaches to tensile actuators 60, 61 that allow for diurnal and declination movements. The tensile actuators link to winding mechanisms 65, 66 for tensile elements 15 connected to the overhead attachment 35 on the vertical structure. In some embodiments, positioning sensor 70 on the mount can provide real-time orientation feedback.

Figure 3:
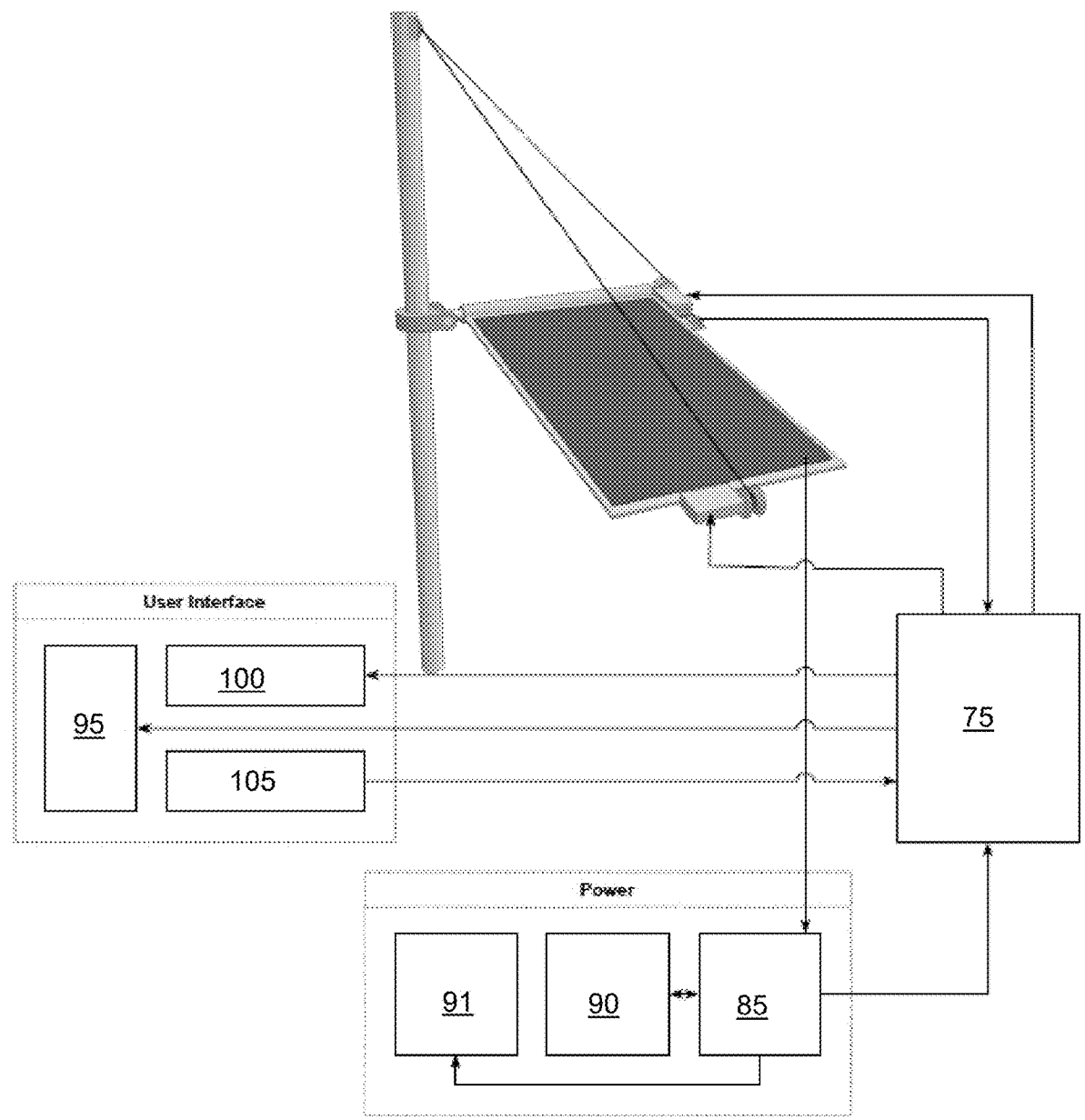
FIG. 3 is a flowchart illustrating a solar tracking system, as well as associated control systems, power management, and user interface in accordance with some embodiments of the presently disclosed subject matter.

FIG. 3 illustrates a flowchart depicting control and power collection of the disclosed system in accordance with some embodiments. Controller board 75 receives data from positioning sensor 70 and calculates required movements for tensile actuators 60, 61 and associated winding mechanisms 65, 66. As noted above, the winding mechanisms retracts and/or extend the tensile elements to change the orientation of panel mount 55 and solar collector 20. More specifically, tensile actuation will result in rotation of the mount and collector around the axis of pivot, as shown by arrows 80 of FIG. 6. Conversely, actuation of tensile actuator 60 results in rotation of mount 55 and collector 20 about central shaft 50, as shown by arrows 81 of in FIG. 7. The tensile actuators are wound using one or more winding mechanisms selected from winches, hoists, pulleys, and/or ratchets. In some embodiments, the tensile actuators can include hydraulic and/or pneumatic force. "Hydraulic force" refers to a mechanical function that operates through the force of liquid pressure (e.g., mechanical movement is produced by pumped liquid, such as through hydraulic cylinders moving pistons). "Pneumatic force" refers to the force exerted by compressed air (e.g., through an easily compressible gas such as air or a suitable pure gas).

Controller board 75 receives updated information from positioning sensor 70 and further refines the position of the mount and panel to optimize the position of the panel to collect or redirect the sun's rays. The solar power is directed to a power control module 85 that stores the energy either locally 90 or remotely 91. Local storage can be used to power the controller board and tensile actuators in the loss of external power and solar radiation, while remote storage can be used to charge an external battery and/or power a device. The device status can be monitored by a visual readout on display 95 and/or audio feedback provided by one or more speakers 100. Control button 105 can be used to manually modify actuation of the panels.

Figure 4A:
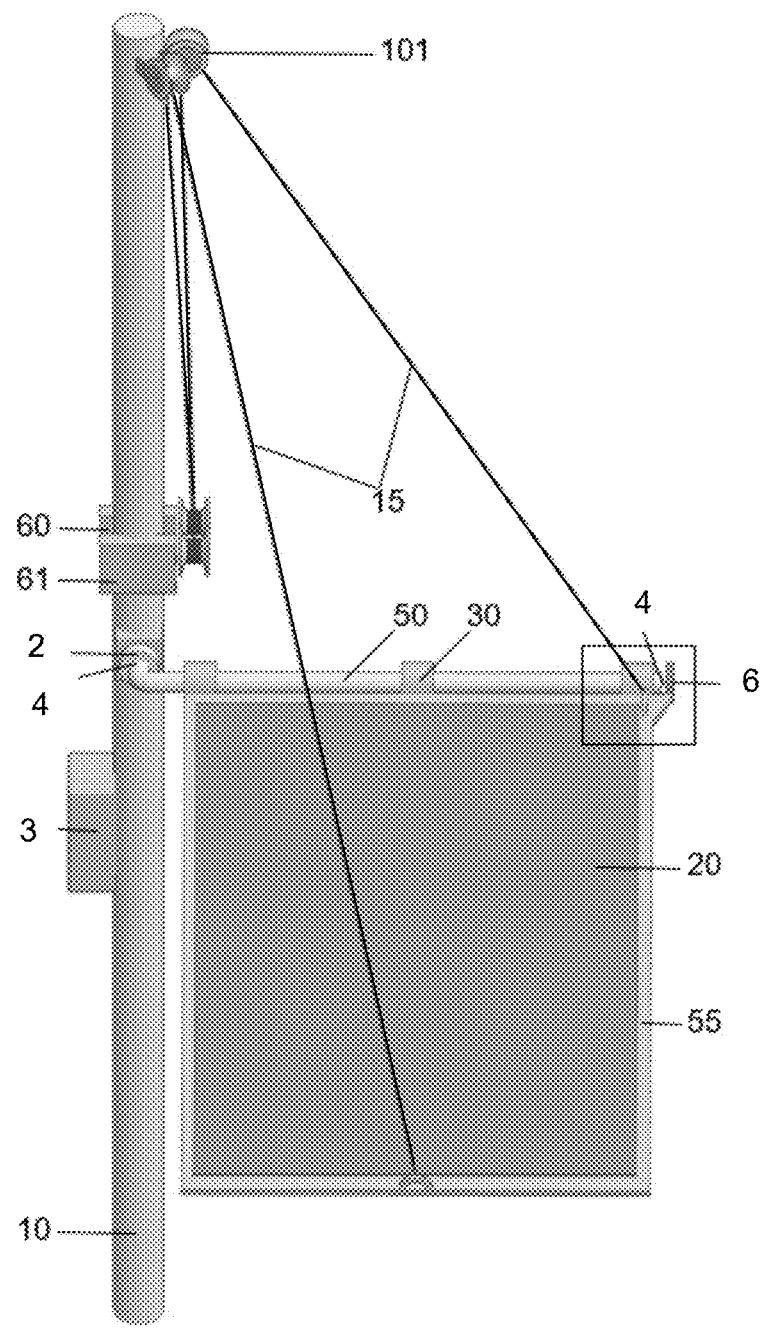
FIG. 4a illustrates a solar tracking system in accordance with some embodiments of the presently disclosed subject matter.
Figure 4B:
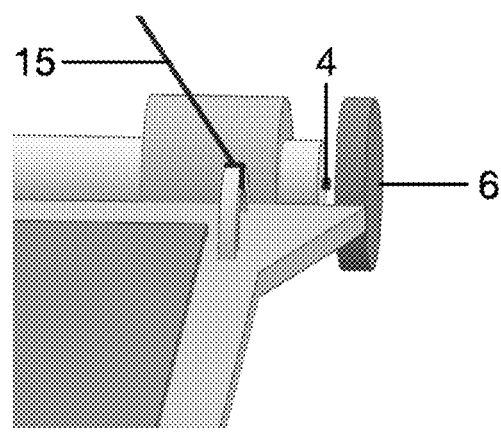
FIG. 4b is an inset of the system of FIG. 4a, illustrating a magnet positioned on the end of the central shaft and a magnetic rotary encoder in accordance with some embodiments of the presently disclosed subject matter.

FIGS. 4a and 4b illustrate one embodiment of the system comprising flange bearing with an embedded magnetic rotary encoder 2. The system also includes controller box 3 and magnet 4 positioned on the end of the central shaft. Magnetic rotary encoder 6 is also shown.

As illustrated in FIGS. 5a-5d, the disclosed system can be height-adjustable. As shown, the system can include actuator 11 for a height actuator. The system also includes tensile element 12 for the height actuator. Attachment point 13 is the location where the tensile element of the height actuator is joined. Attachment point 14 is illustrated for the panel tensile elements. Travel mechanism 16 allows for movement along a vertical support (e.g., a caster or other similar element). Pile guide 17 acts as a boundary line that surrounds vertical support 10, keeping shaft 50 on the intended path. The system also includes a mechanism 18 that provides the proper spacing between the pile guides 17, without which the lower pile guide will move upwards when the corners of the panel are lowered. The mechanism 18 can be a rigid spacer as shown in FIGS. 5a-5d, but a cable from below or other mechanism could also provide proper spacing by preventing the lower pile guide from collapsing upwards.

Figure 6:
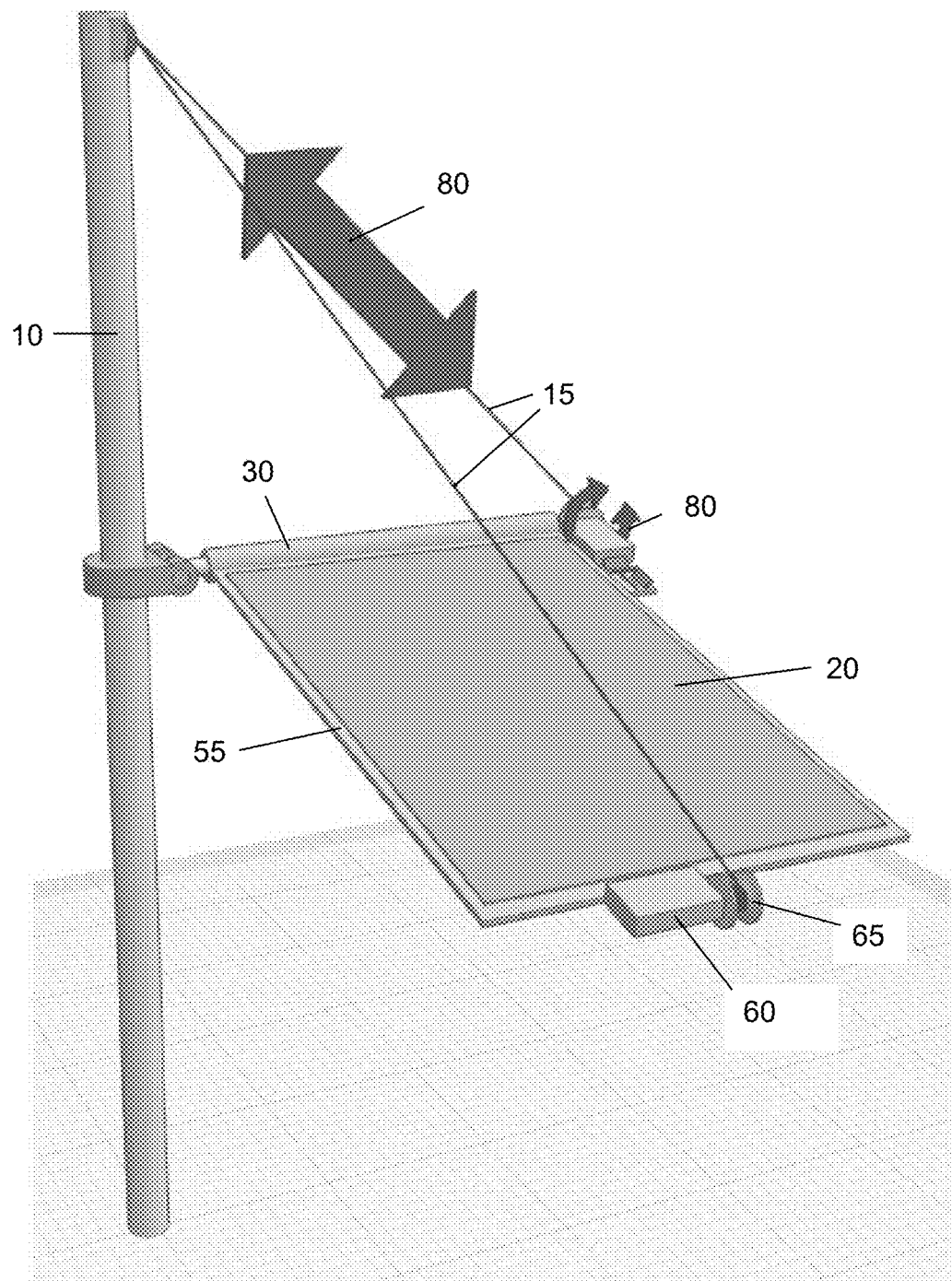
FIG. 6 is a perspective view illustrating rotation of a system supporting pivot in accordance with some embodiments of the presently disclosed subject matter.
Figure 7:
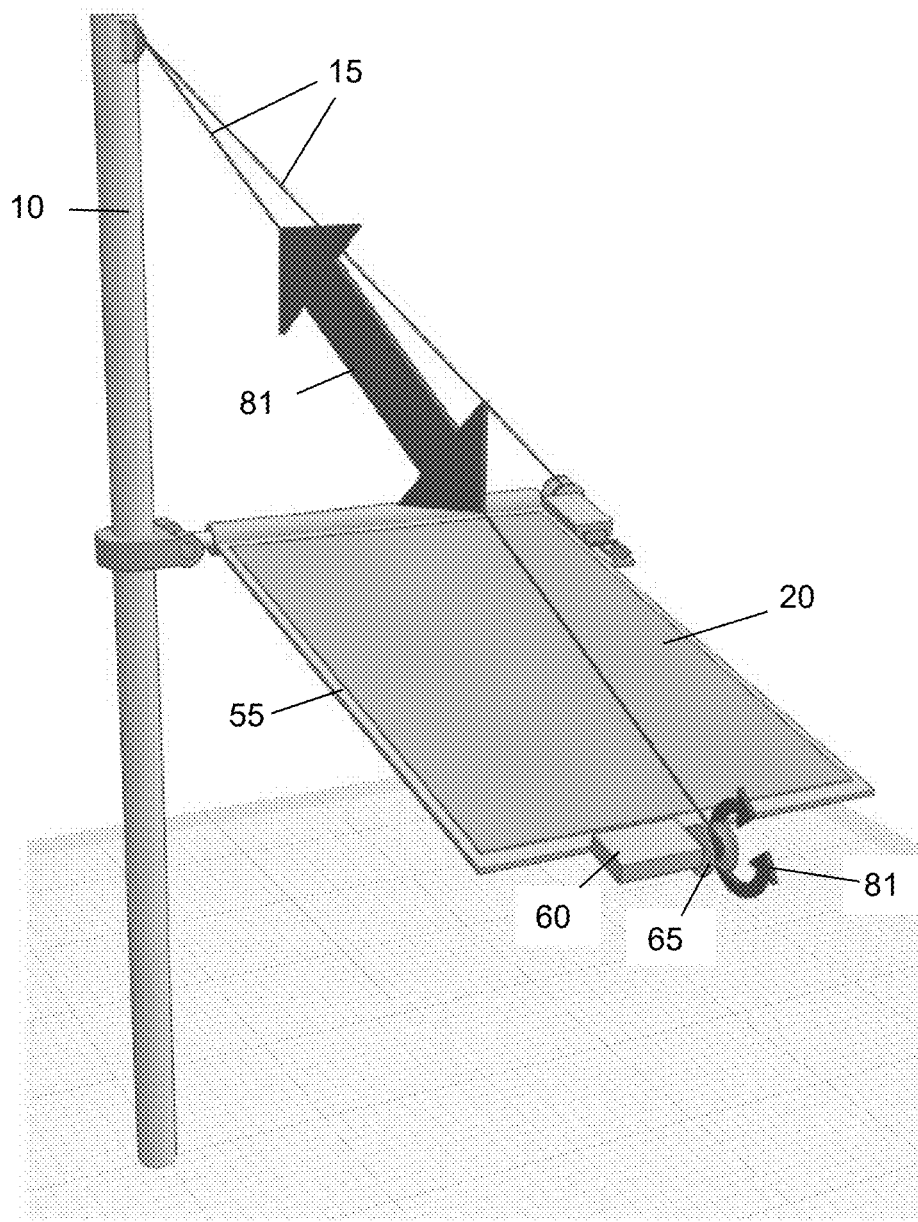
FIG. 7 is a perspective view illustrating rotation of a system central cylinder in accordance with some embodiments of the presently disclosed subject matter.
Figure 8A:
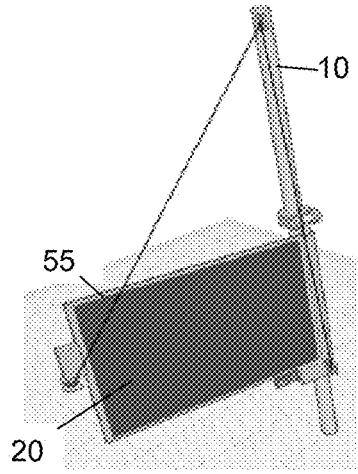
FIGS. 8a-8c illustrate perspective views of summer positions of a pole-mounted system at dawn, midday, and dusk (35.9°N latitude), respectively in accordance with some embodiments of the presently disclosed subject matter.
Figure 8B:
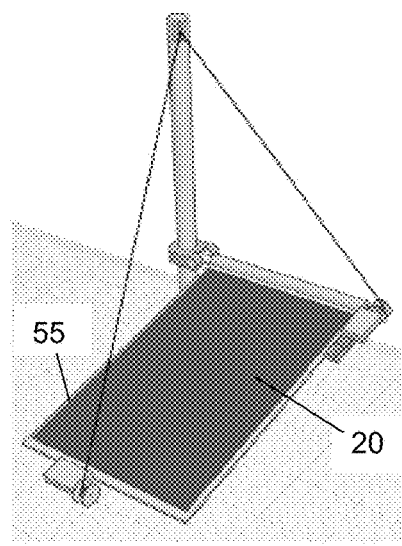
Figure 8C:
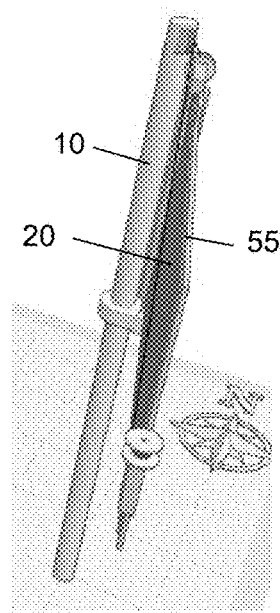
Figure 9A:
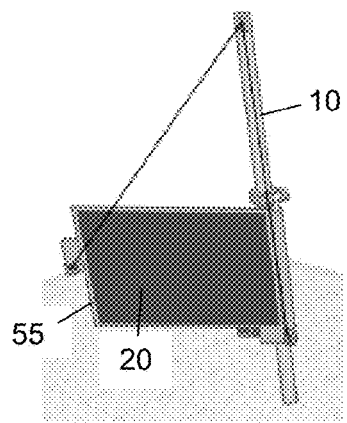
FIGS. 9a-9c are perspective views of winter positions of a pole-mounted system at dawn, midday, and dusk (35.9°N latitude), respectively in accordance with some embodiments of the presently disclosed subject matter.
Figure 9B:
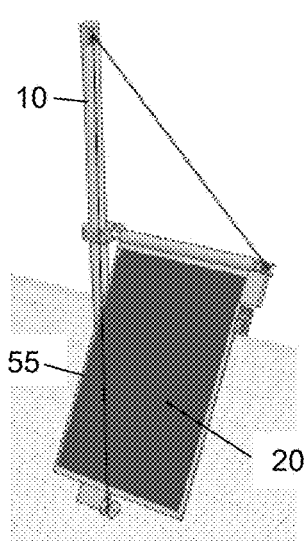
Figure 9C:
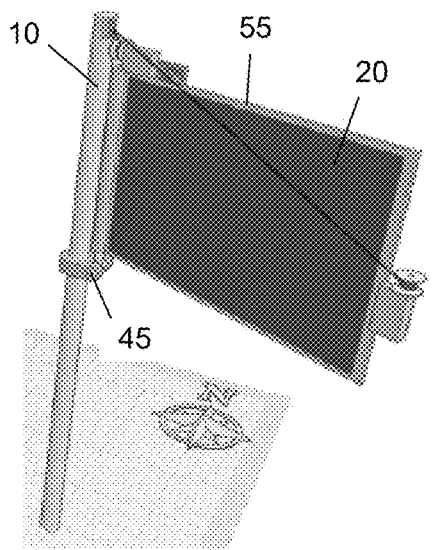

For installation of the overhead tensile-actuated solar tracking system on vertical support 10 (e.g., a freestanding post), the rotational axis of rotating cylinder 30 can extend along an east-west direction and be attached to the non-equatorial side (i.e., 'northern' in the northern hemisphere) of panel mount 55 in some embodiments. In such configurations, rotation around the support pivot 45 tracks diurnal motion (as shown in FIG. 6) while rotation around the central cylinder (as shown in FIG. 7) accounts for solar declination. Using both motions together allows the panel to track the sun's daily movement (FIGS. 8a-8c) and seasonal movement (FIGS. 9a-9c). The system rotation can be automated using positioning sensor 70 and/or can be moved via user input.

Figure 10A:
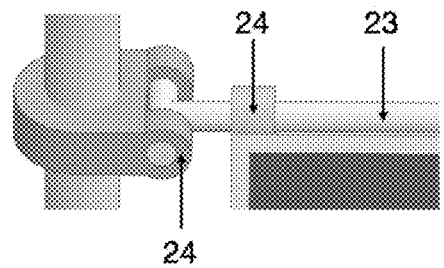
FIGS. 10a-10d illustrates various arrangements of the supporting pivot, central shaft and bearings in accordance with some embodiments of the presently disclosed subject matter.
Figure 10B:
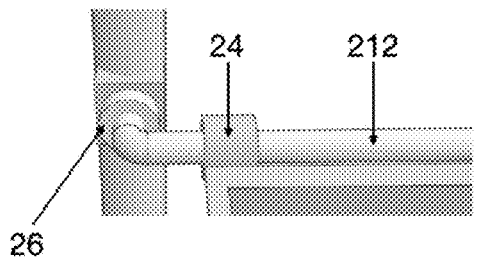
Figure 10C:
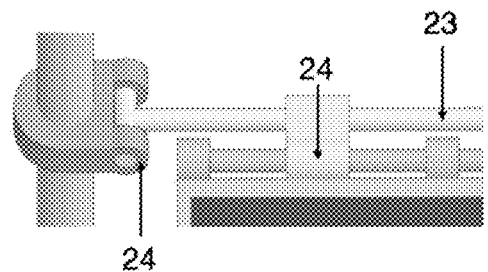
Figure 10D:
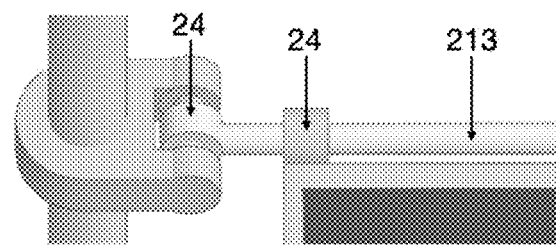

As shown in FIGS. 10a-10d, in some embodiments a T-shaped shaft 23 with pillow block bearings 24 can be used. Specifically, FIG. 10a illustrates a T-shaped shaft with pillow block bearing(s) attached to the panel, rotating around the long end of the shaft to form the rotating central cylinder. Pillow block bearing(s) attached to the vertical support rotate around the short end(s) of the 'T' forming the supporting pivot. FIG. 10b illustrates an L-shaped shaft 212 connecting to a flange bearing 26 on the vertical support to form the supporting pivot. In some embodiments, a rotary encoder on the 'L' end of the shaft in the flange detects the angle of rotation. FIG. 10c illustrates a T-shaped shaft where the pillow block bearing 24 is attached to the shaft and rotates around a shaft on the panel. FIG. 10d illustrates one embodiment wherein a straight shaft 213 is attached to the pillow block bearing that rotates around a shaft affixed to the vertical support structure.

Figure 11:
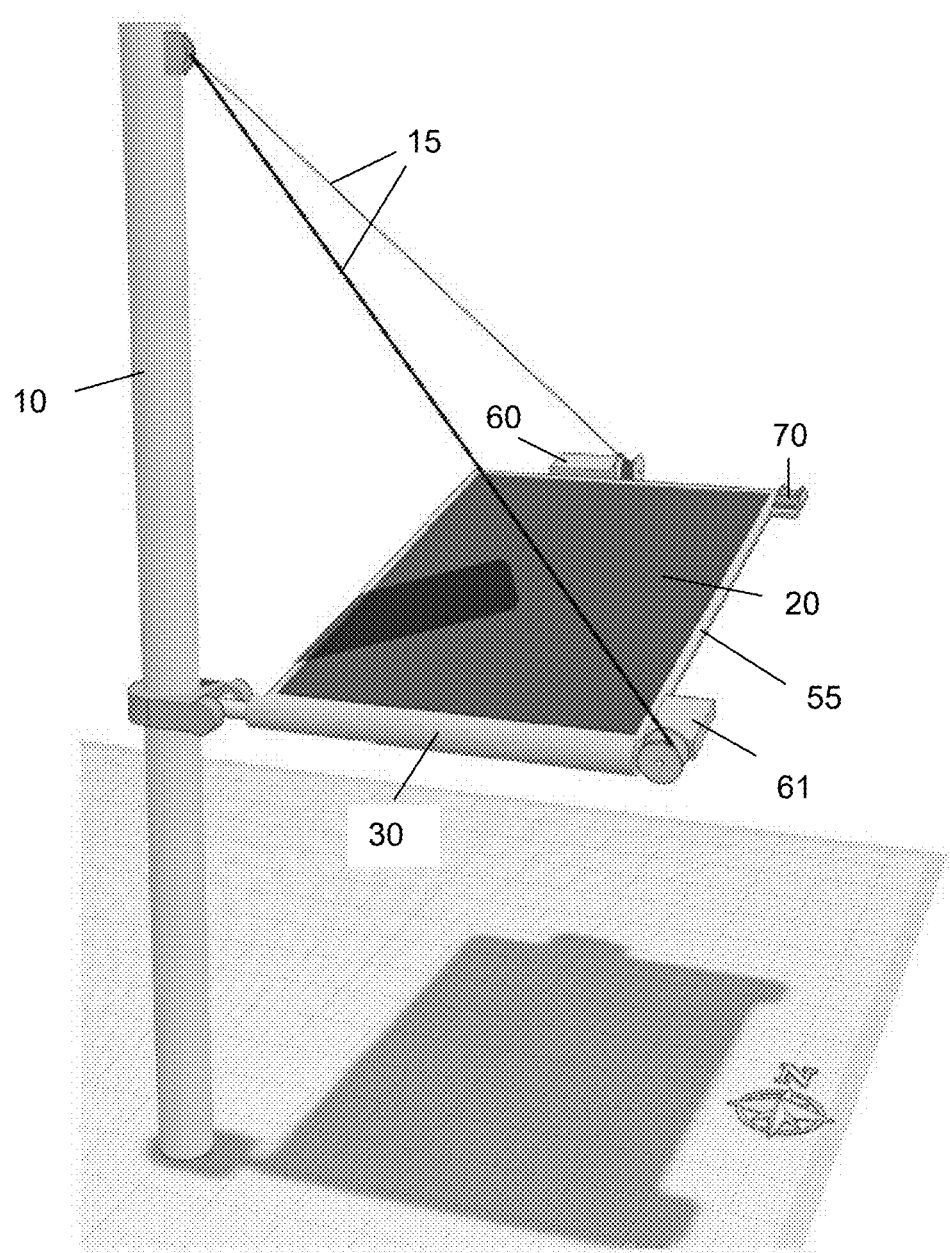
FIG. 11 is a perspective view of a solar tracking system and associated shadow cast on the panel of a device built with the cylinder on the equatorial side of the panel mount in accordance with some embodiments of the presently disclosed subject matter.
Figure 12:
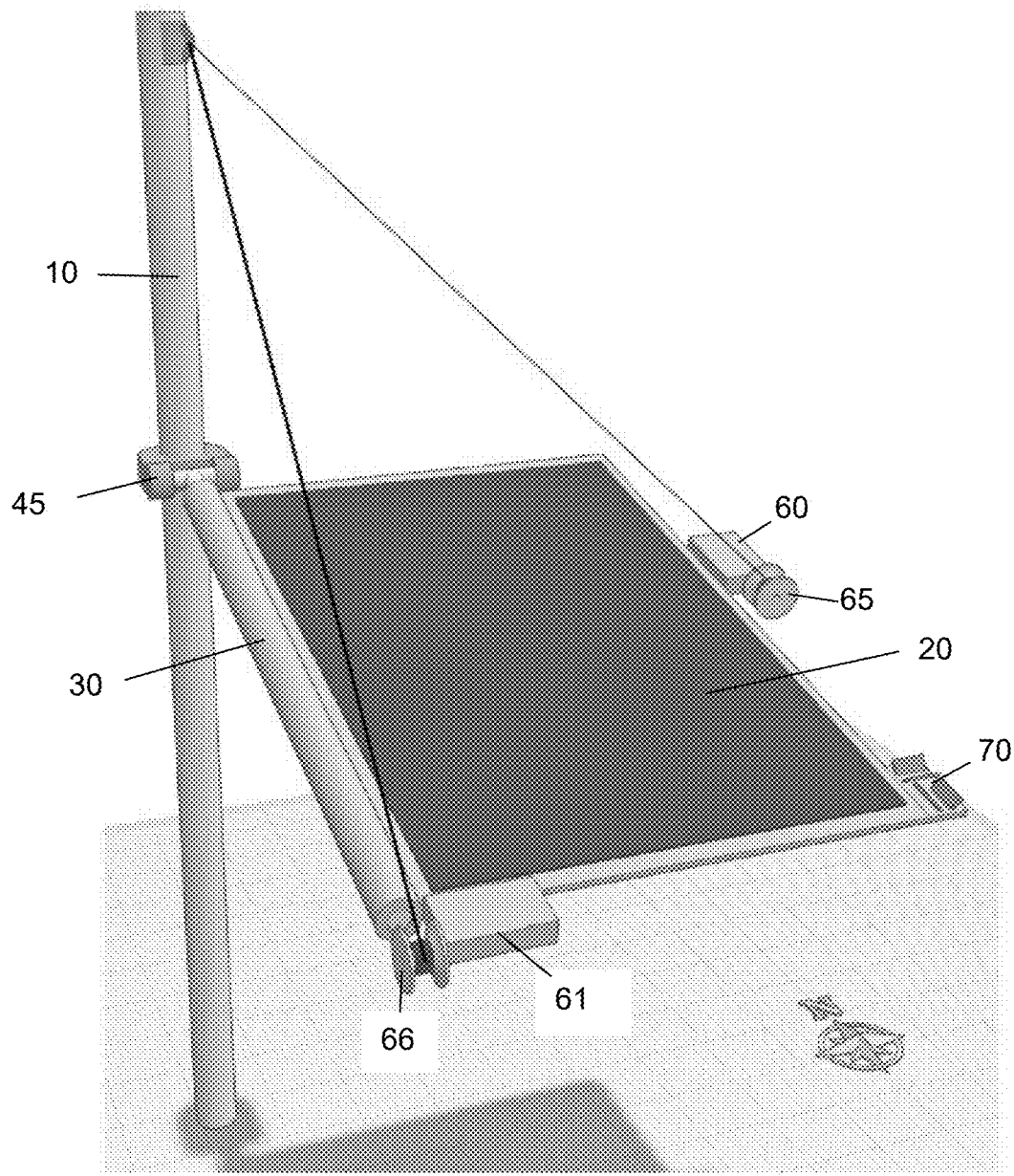
FIG. 12 is a perspective view of a pole mounted system oriented such that cylinder rotation adjusts for diurnal motion instead of seasonal declination in accordance with some embodiments of the presently disclosed subject matter.
Figure 13:
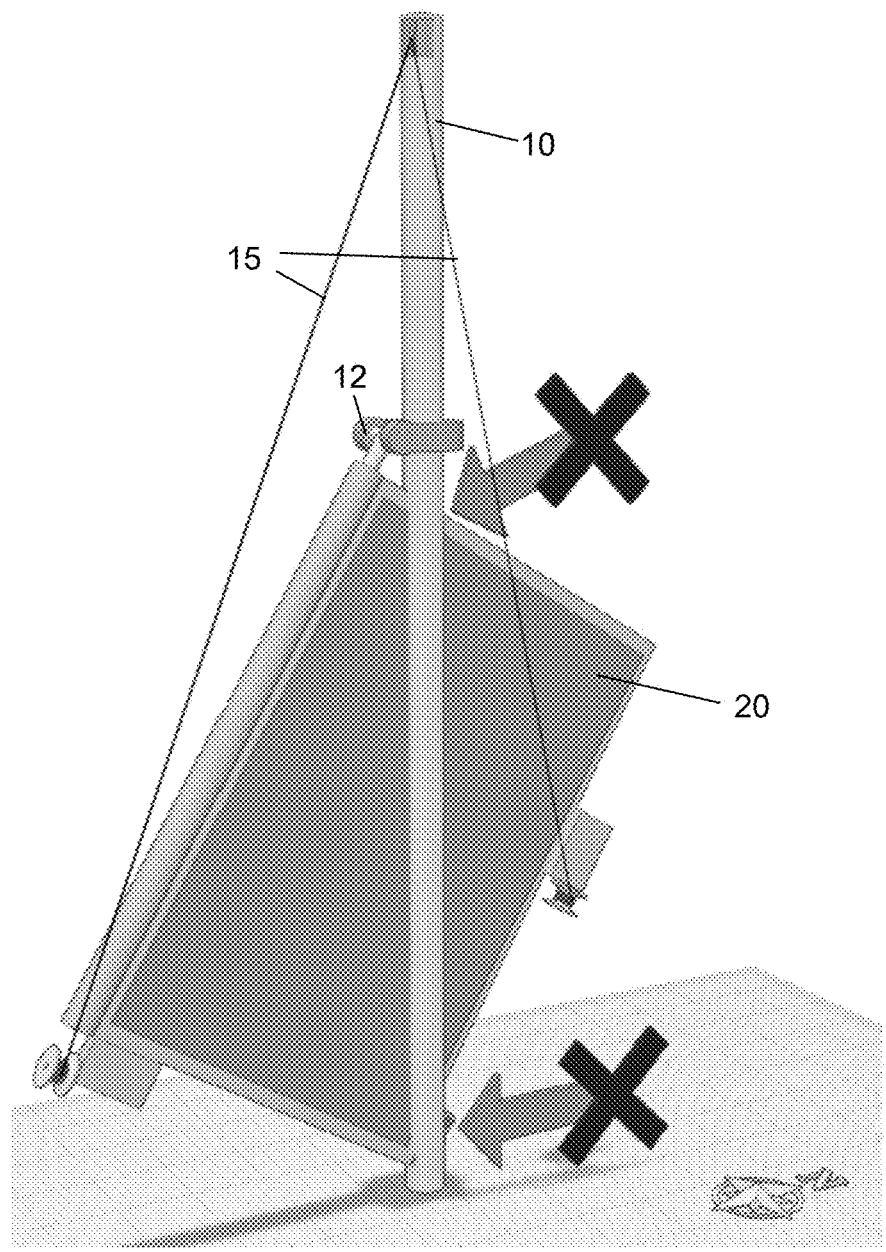
FIG. 13 is a perspective view illustrating collision risks when using cylinder rotation to control diurnal motion instead of seasonal declination in accordance with some embodiments of the presently disclosed subject matter.
Figure 14A:
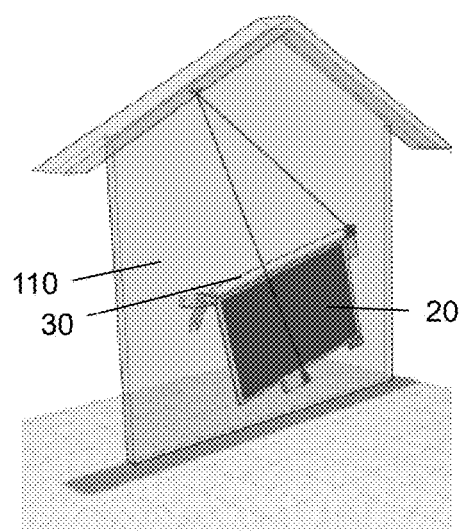
FIGS. 14a and 14b are perspective views illustrating residential home summer positions of an overhead tensile-actuated solar tracker at dawn and midday, respectively (35.9°N latitude) in accordance with some embodiments of the presently disclosed subject matter.
Figure 14B:
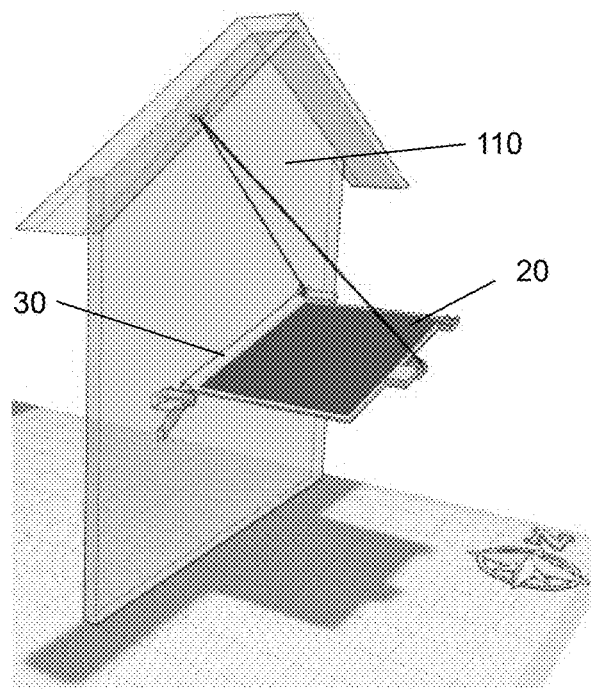
Figure 15A:
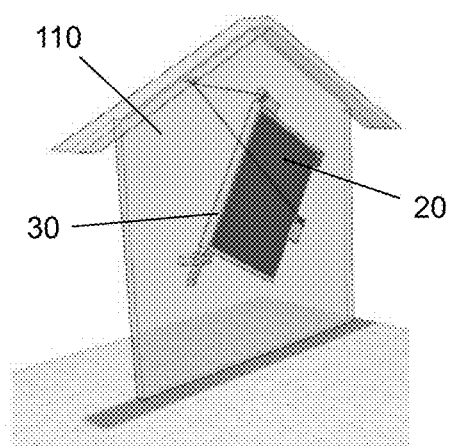
FIGS. 15a and 15b are perspective views illustrating residential home winter positions of an overhead tensile-actuated solar tracker at dawn and midday, respectively (35.9°N latitude) in accordance with some embodiments of the presently disclosed subject matter.
Figure 15B:
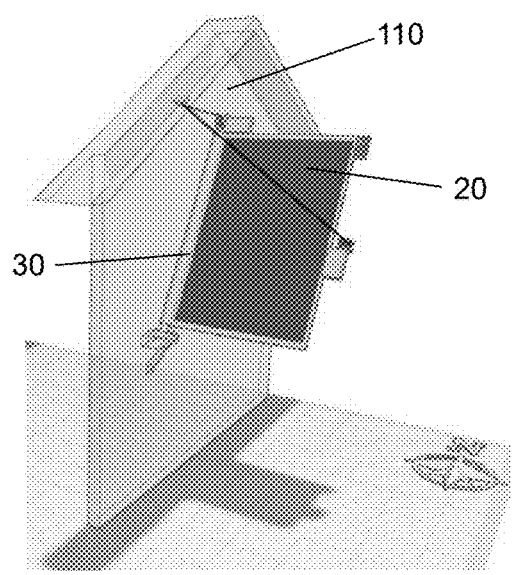

It should be appreciated that system 5 can be configured in a variety of orientations. The rotating cylinder can be positioned on the western or eastern side of panel mount 55. Either side can be selected due to aesthetics and/or environmental constraints. Depending on the environment, attachment of rotating cylinder 30 to the equatorial side (i.e., "southern side" in the northern hemisphere) of the panel mount can be suitable in some embodiments. However, the supporting structure would cast a shadow on the panel, as illustrated in FIG. 11. Although the device can be rotated 90 degrees to allow the rotating cylinder to track diurnal motion and supporting pivot 45 to track solar declinations as shown in FIG. 12, it should be ensured that the solar collecting element does not collide with the supporting structure if the central cylinder is center aligned with the vertical support structure, as shown in FIG. 13. Elements for detecting collisions for possible impacts with the environment can include (but are not limited to) proximity sensors, preprogramed movement limits, detection of an excessive force on the tensile actuators, and/or physical restrictions to block collisions.

Figure 16:
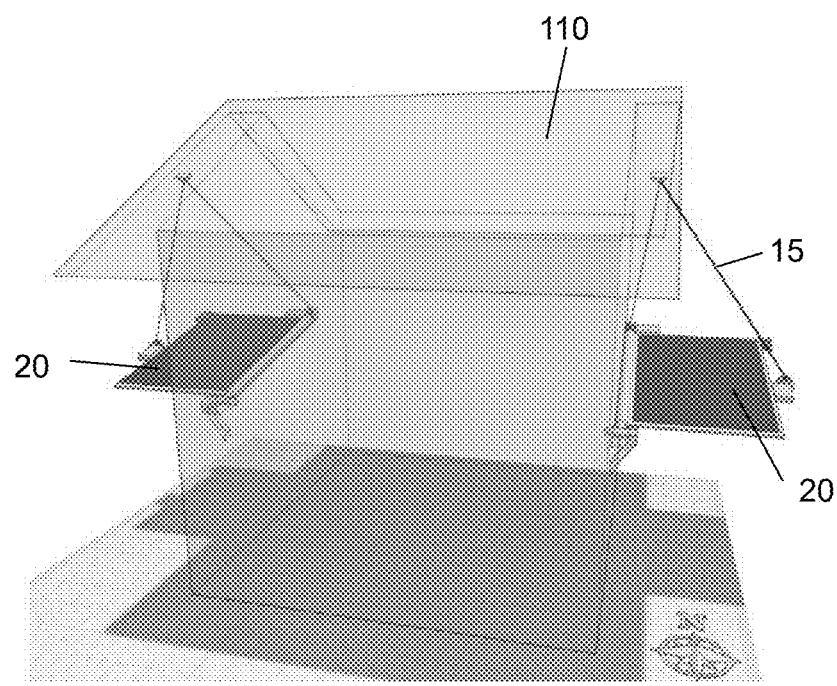
FIG. 16 is a perspective view of a residential home that includes panels installed on the eastern and western walls in accordance with some embodiments of the presently disclosed subject matter.
Figure 17:
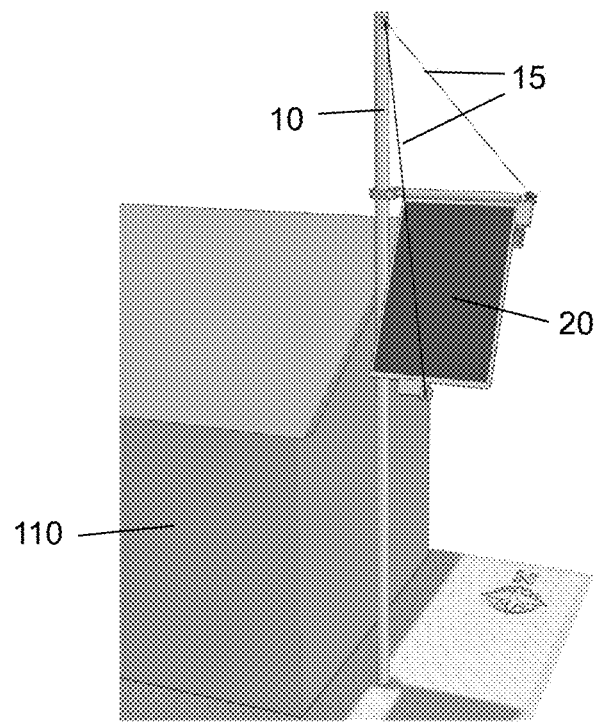
FIG. 17 is a perspective view of a raised system adjacent to a home, tracking from dawn to dusk in accordance with some embodiments of the presently disclosed subject matter.

In some embodiments, overhead tensile-actuated solar tracking systems can be installed along a large building or structure and still provide dual-axis tracking of the sun throughout the year, as shown in FIGS. 14a-14b and 15a-15b. In some embodiments, the system can be installed such that the rotational axis of supporting pivot 45 is perpendicular to the structure with the rotating axis of central cylinder 30 parallel to supporting structure 110. Installation along a southern wall can be recommended in some embodiments to give solar cell 20 as much access to the sun as a pole mounted system. Eastern and western installations are also possible along the supporting structure (as illustrated in FIG. 16) but would be shadowed for a large portion of the day. The shadow can be avoided in some embodiments by mounting on a post adjacent to the structure, as shown in FIG. 17.

Figure 18:
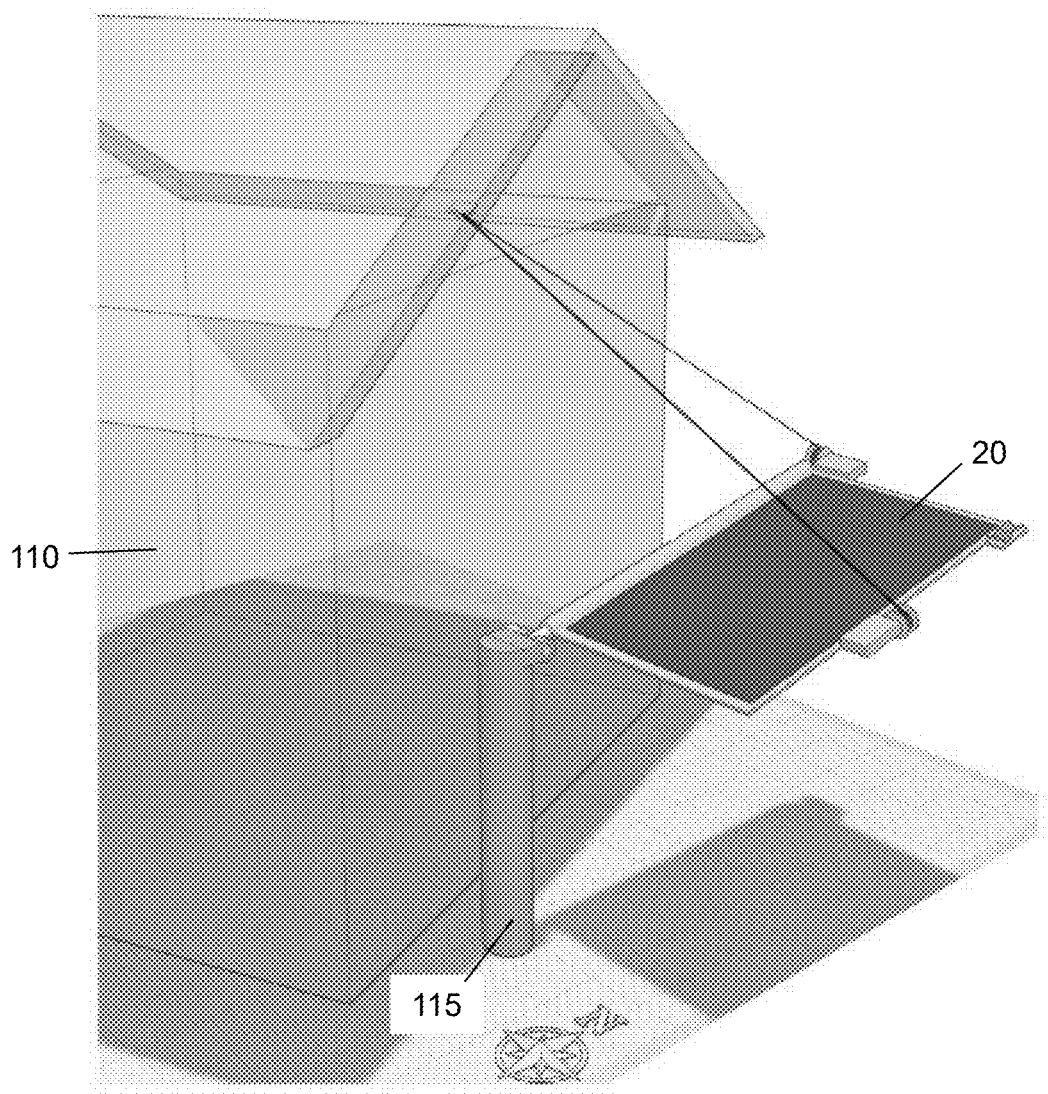
FIG. 18 is a perspective view of solar tracking system mounting options for a home with non-cardinal alignment in accordance with some embodiments of the presently disclosed subject matter.
Figure 19:
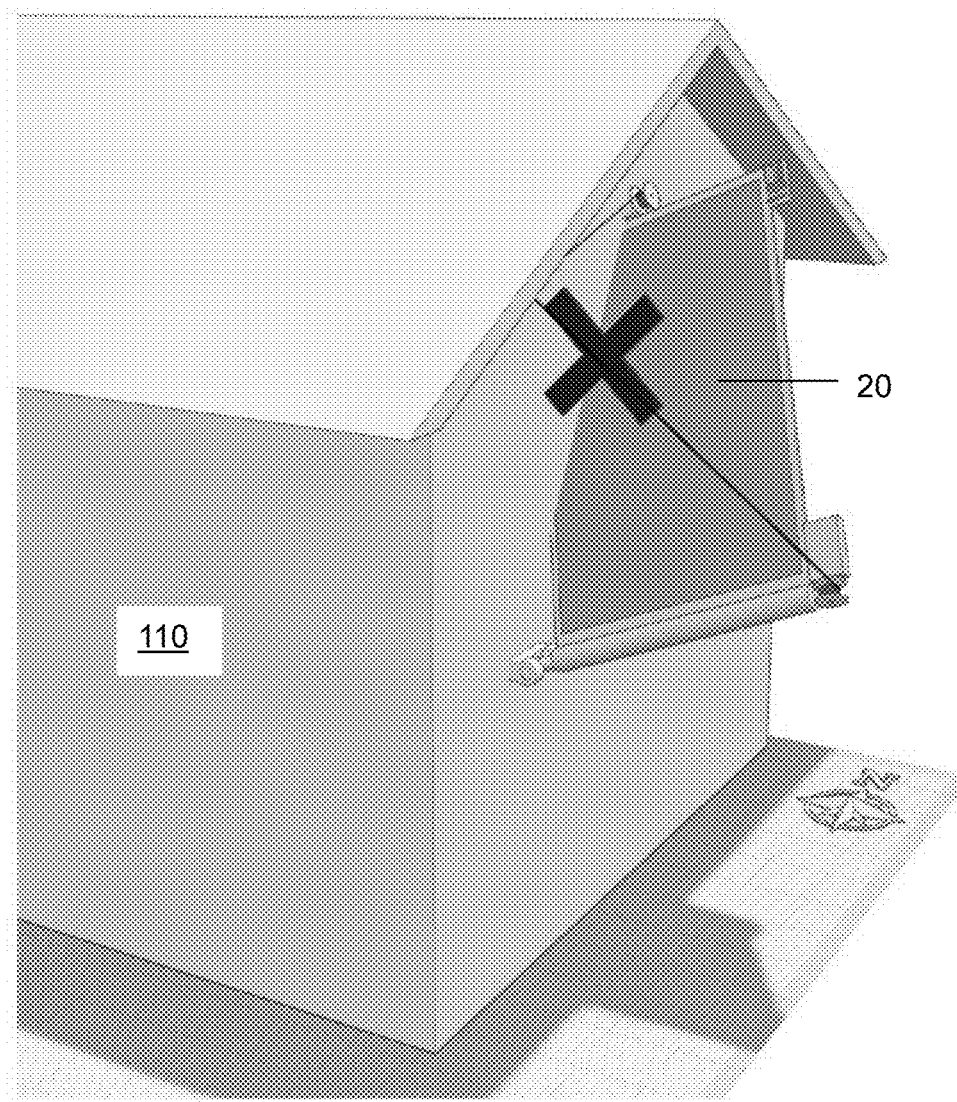
FIG. 19 is a perspective view of collision risks when a system supporting pivot axis is parallel to the side of the structure in accordance with some embodiments of the presently disclosed subject matter.
Figure 20:
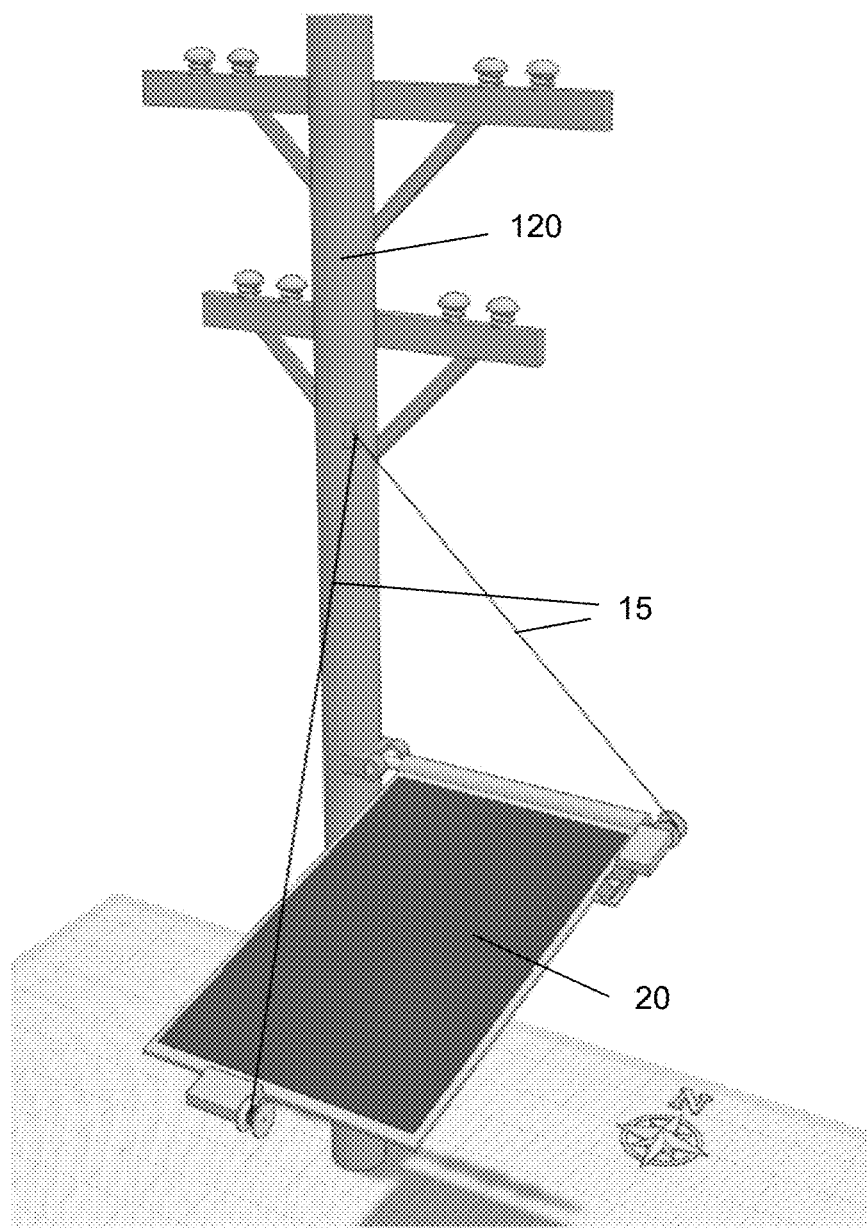
FIG. 20 is a perspective view of a utility pole mounted with an overhead tensile-actuated solar tracking system in accordance with some embodiments of the presently disclosed subject matter.
Figure 21:
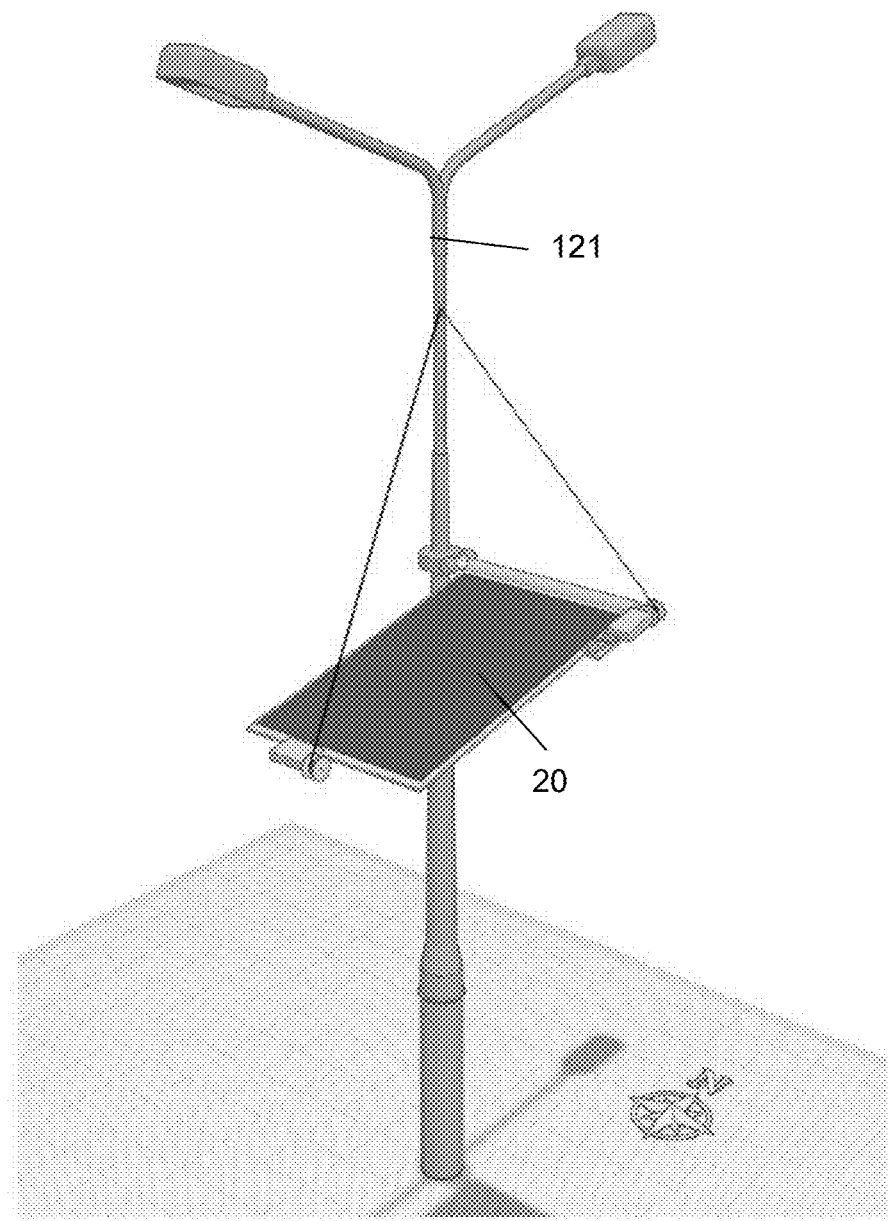
FIG. 21 is a perspective view of a streetlight mounted with an overhead tensile-actuated solar tracking system in accordance with some embodiments of the presently disclosed subject matter.
Figure 22:
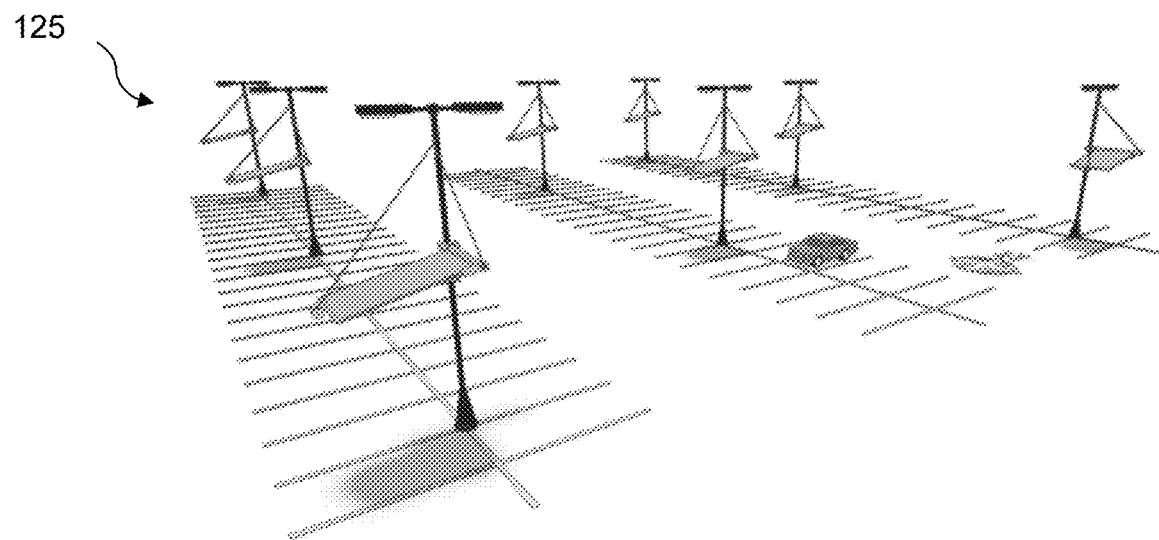
FIG. 22 is a perspective view of conversion of parking lot into solar farm in accordance with some embodiments of the presently disclosed subject matter.

An additional supporting column 115 can be used with structures 110 that do not neatly align with cardinal directions (as shown in FIG. 18) or to escape the shadow of the supporting structure. As with the freestanding installation, the solar cell can be rotated about 90 degrees, but precautions should be taken to ensure it does not collide with the supporting structure, as illustrated in FIG. 19. Such flexibility allows system 5 to be installed on existing vertical structures, such as utility poles 120 and lamp posts 121, as shown in FIGS. 20 and 21. As such, the disclosed system can convert existing properties (e.g., neighborhoods, streets, and parking lots) into solar farms 125, as shown in FIG. 22. The term "solar farm" refers to any of a wide variety of large or medium scale grid-connected photovoltaic power systems that convert incoming light into electrical energy.

Figure 23:
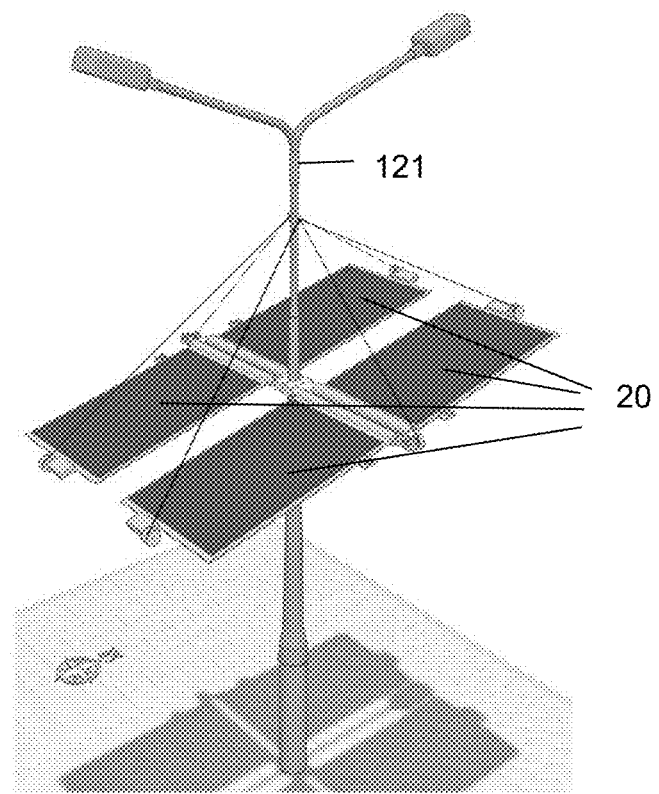
FIG. 23 is a perspective view of a vertical structure comprising multiple units in accordance with some embodiments of the presently disclosed subject matter.
Figure 24:
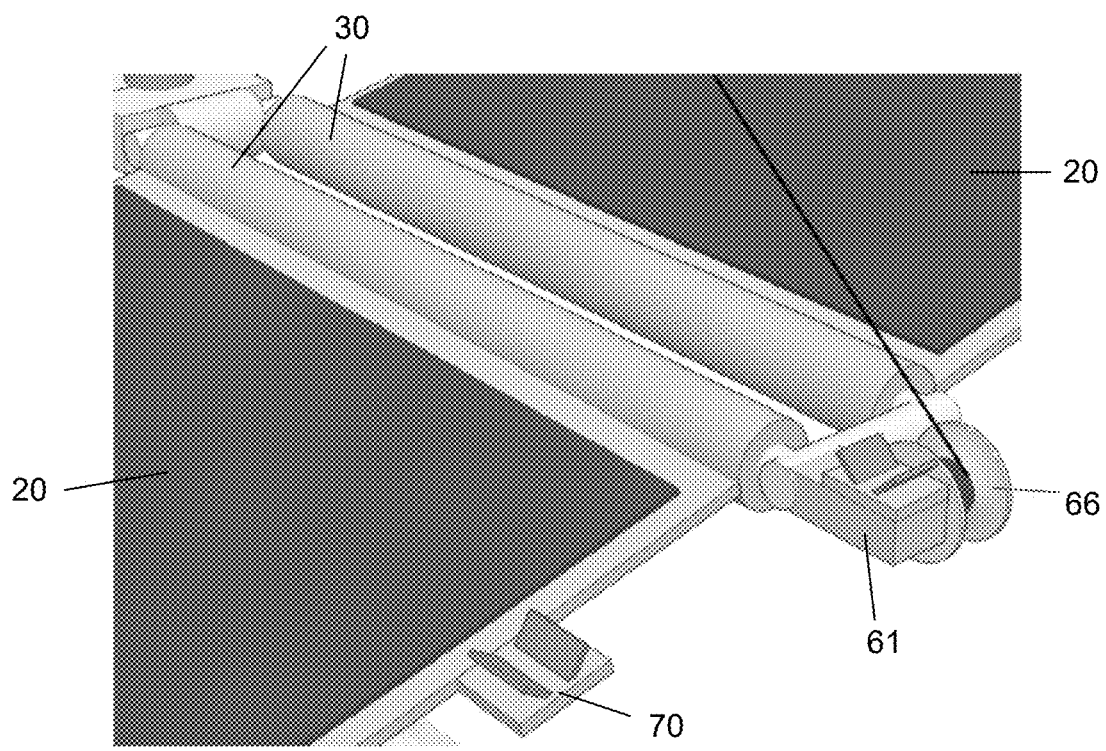
FIG. 24 is a perspective view of a pivot, tensile actuator, tensile element, and positioning sensor shared when mounting multiple units on the same vertical structure in accordance with some embodiments of the presently disclosed subject matter.

In some embodiments, more than one overhead tensile-actuated solar tracker can be mounted to a vertical structure to increase the power generated at a single site, as shown in FIGS. 23 and 24. Optionally, the systems can share common elements such as tensile elements 15, overhead attachments 35, actuators 61, winding mechanisms 66, positional sensors 70, pivots 45, controllers 75, and/or power storage 90, 91.

Figure 25:
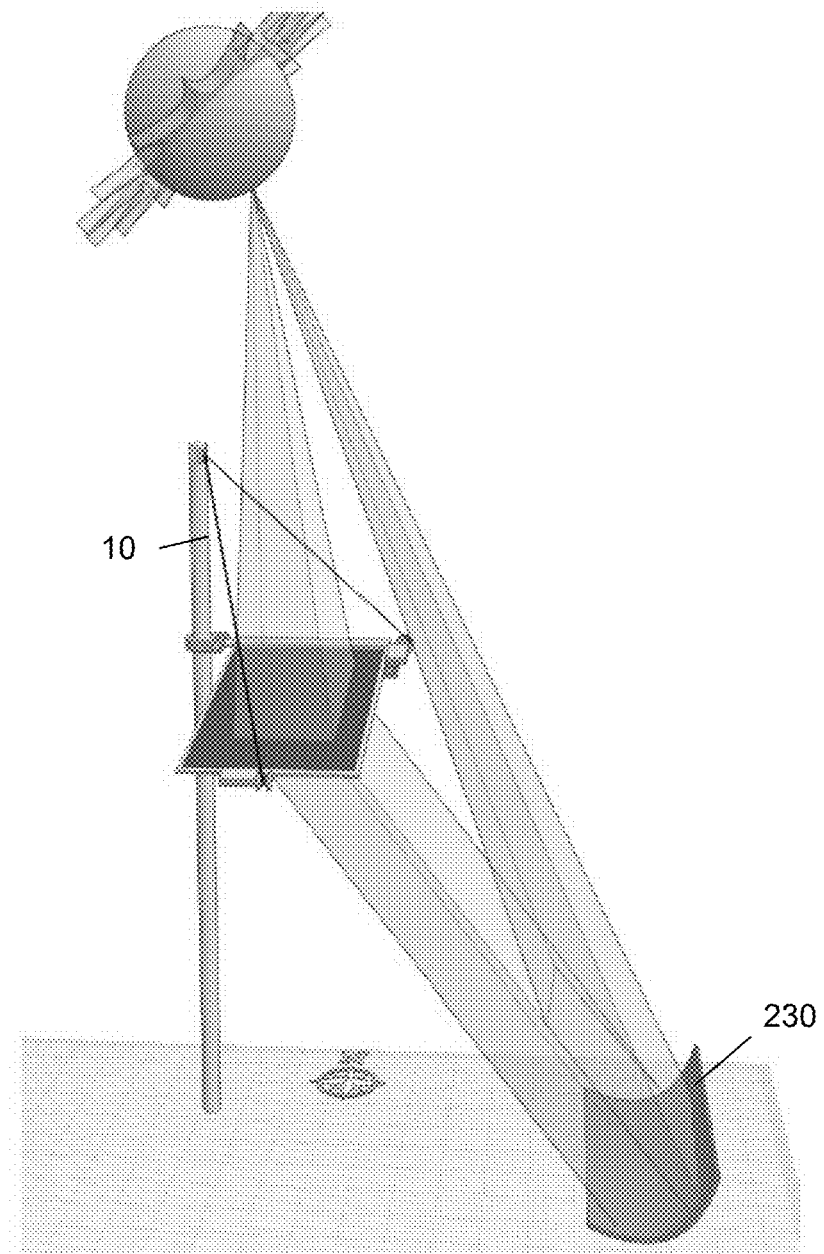
FIG. 25 is a side plan view illustrating actively illumination of the underside of a bifacial panel in accordance with some embodiments of the presently disclosed subject matter.

In some embodiments, bright and/or reflective surfaces 230 (e.g., glass, mirrored glass, metallic materials) can be included to further increase the energy production gains by illuminating the bottom side of bifacial solar collecting panels, as shown in FIG. 25. Bifacial solar panels refer to a class of photovoltaic cell or solar panel that has two substantially planar light receiving faces and the normal directions of the two substantially planar light receiving faces of a bifacial solar panel are about 180° from each other. The bottom side may be actively illuminated with reflected light as shown but can also produce power from ambient light from the sky or any high albedo surfaces. "Albedo" refers to the fraction of incident radiation (such as light) that is reflected by a surface or body.

Figure 26:
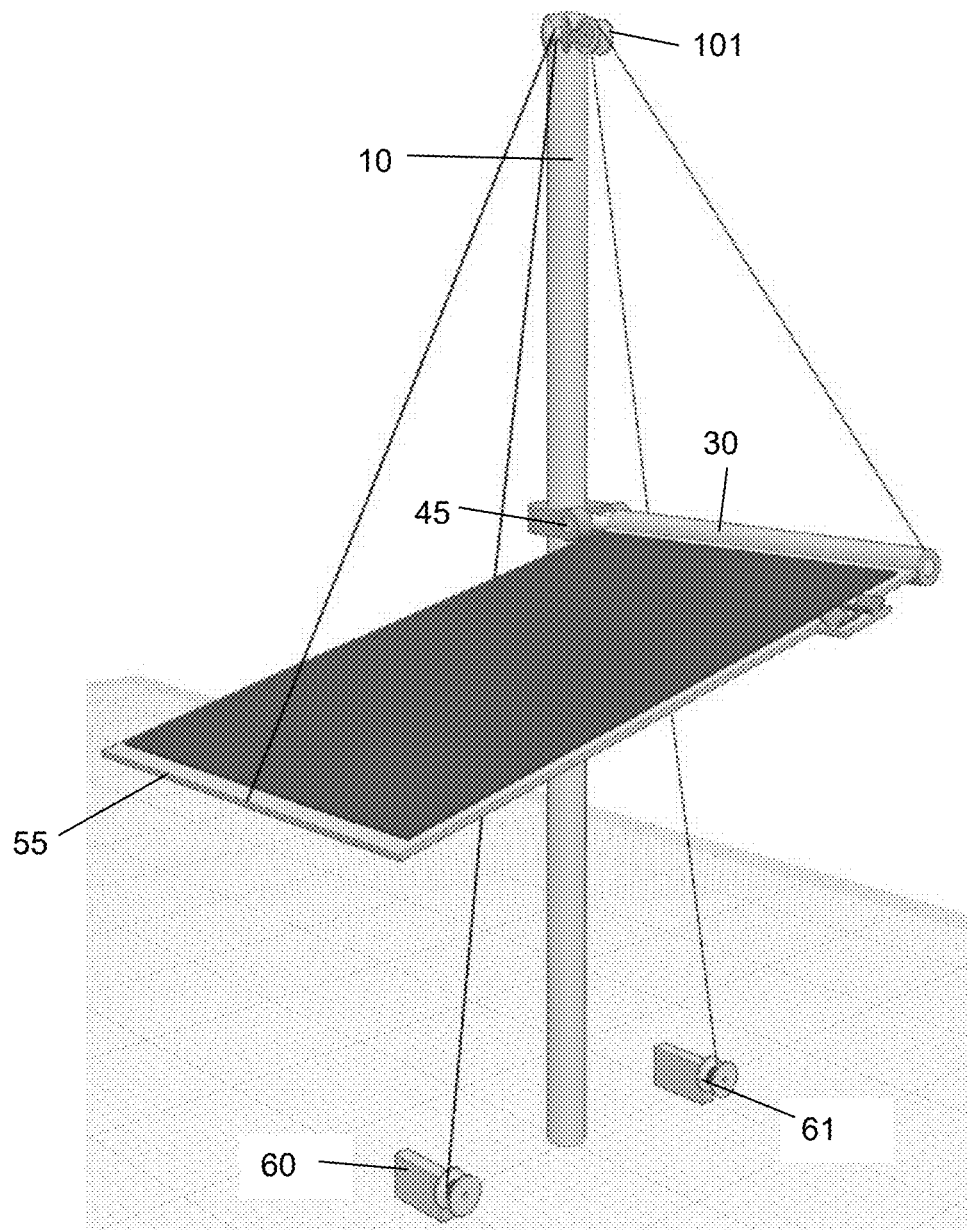
FIG. 26 is a perspective view illustrating redirection of tensile force for actuators mounted below the plane of a panel mount to overhead via pulleys in accordance with some embodiments of the presently disclosed subject matter.
Figure 27:
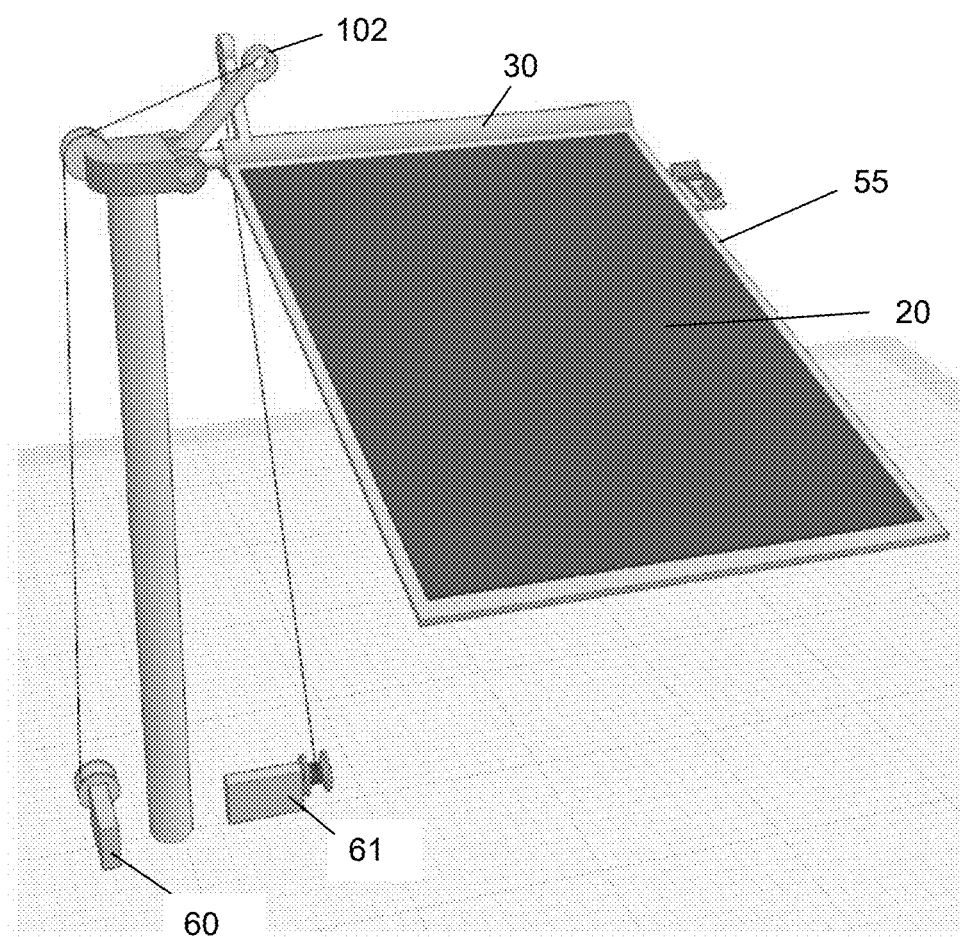
FIG. 27 is a perspective view illustrating redirection of tensile force for actuators mounted below the plane of the panel mount to overhead using levers connected to the supporting pivot and central cylinder in accordance with some embodiments of the presently disclosed subject matter.
Figure 28:
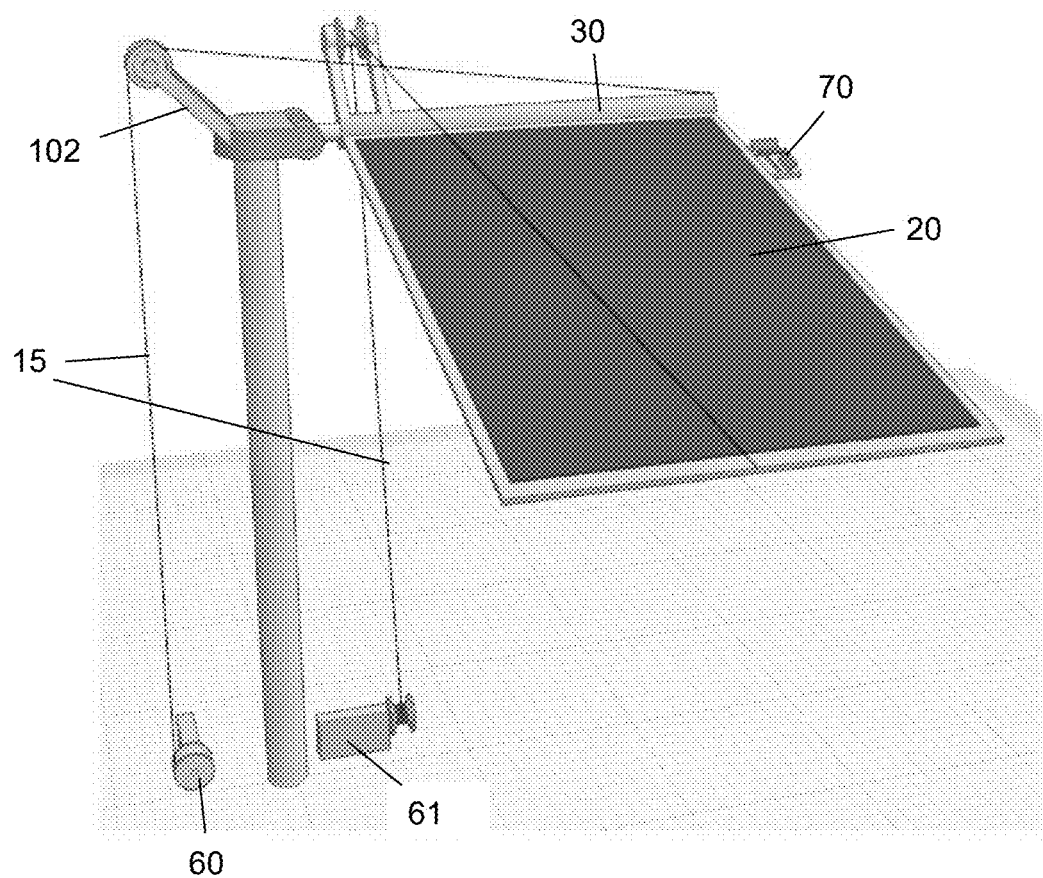
FIG. 28 is a perspective view illustrating redirection of tensile force for actuators mounted below the plane of a panel mount to overhead using leveraged pulley blocks connected to a supporting pivot and central cylinder in accordance with some embodiments of the presently disclosed subject matter.

In some embodiments, one or more tensile actuators 60, 61 can be positioned below the plane of panel mount 55 and redirect its force via tensile elements 15 to above the panel via any mechanical implementation (e.g., pulleys 101 and/or levers 102) as shown in FIGS. 26-28. The force can then be directed to supporting pivot 45 and/or central cylinder 30. Such a configuration allows the system to be mounted closer to the apex of the supporting vertical structure 10 to rotate the solar collector over the height of an existing support.

While solar collectors can orient the plane of the panel mount orthogonally (e.g., perpendicularly) to the sun's incoming rays, one or more heliostats can be used to select a different orientation to redirect the sun's light to a central collecting device.

Figure 29:
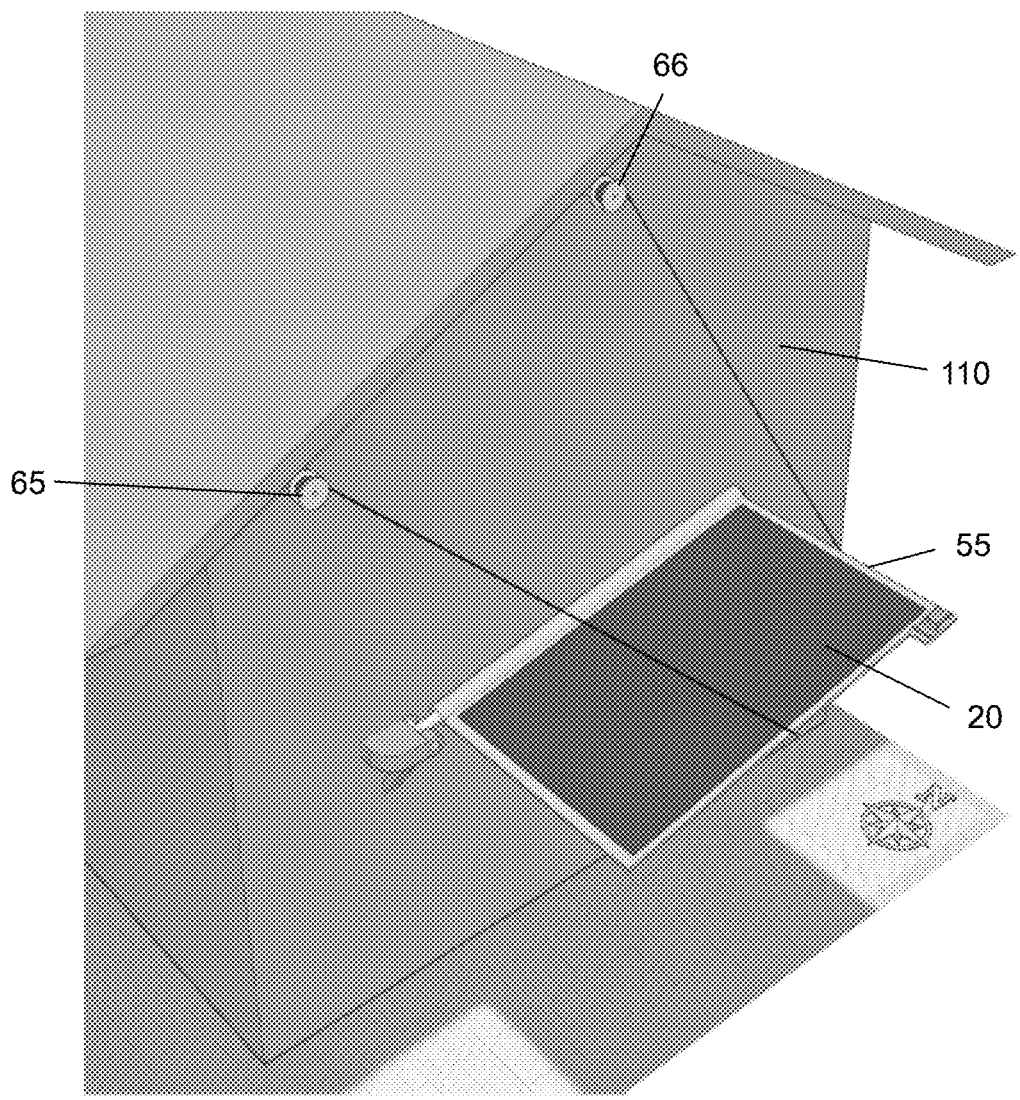
FIG. 29 is a perspective view of a solar tracking system that includes tensile actuation on the support structure instead of the panel mount with multiple top attachment points in accordance with some embodiments of the presently disclosed subject matter.

Depending on the needs of the supporting structure and panels, the overhead attachments can be positioned at separate locations and/or tensile actuators 60, 61 can be located on an overhead surface rather than on panel mount 55, as shown in FIG. 29. Additionally, in some embodiments, the apical attachments can be positioned at any location that can accommodate the support structure, improve the leverage of the tensile elements, and/or prevent the device from rotating too far.

In some embodiments, the tensile actuators can be configured to rotate on a swivel, spring, rotational hinges, spacers, pulleys, eye screw, eye bolt, snatch block, pivot, bearing assembly, and/or any other mechanism with respect to an attachment point to better adjust to the changing angle with the panel mount.

The supporting pivot can be permanently or removably suspended via a tensile element for quick mounting and dismounting in some embodiments.

The disclosed system can optionally include one or more security elements to aid in safety and protection. For example, one or more cameras and/or touch sensors can be used to detect tampering. Additional sensors can further detect the disconnection of components. Particularly, wind information can signal the panels to retract to a safer orientation or to automatically unmount and store.

Optionally, the system can include additional security cables 140 connecting the vertical support to the panel mount. This attachment would not interfere with movement, but still aid in preventing theft and/or injury.

In some embodiments, the system can include panels equipped to report status, alerts, and/or performance via satellite, hard-wiring, or WiFi connection. Safety commands can also be controlled via these connections to direct the movement of the disclosed system. Any suitable command can be issued, such as (but not limited to) stopping movement to avoid collision, going to a safety position during high winds, dismounting, and/or shutting down solar collection to avoid electrical shock.

System 5 can be permanently or releasably mounted. To this end, the system can include retracting or telescopic vertical structures that allow rapid deployment of the system in some embodiments. Smaller systems can be easily transported and/or mounted on mobile objects (e.g., vehicles, equipment, trailers).

In addition to collecting solar energy, the system 5 can be used to collect light and/or signals from other celestial bodies or manmade objects, making gross movements to optimize the sending and/or receiving of signals from devices that include radio telescopes, radar dishes or phased arrays.

Solar collecting panels 20 can have any suitable shape and dimensions. To this end, the solar collectors need not be strictly rectangular and can have angled or curved edges for aesthetics, avoiding collisions, accommodating wind, and/or improving collection.

Figure 30A:
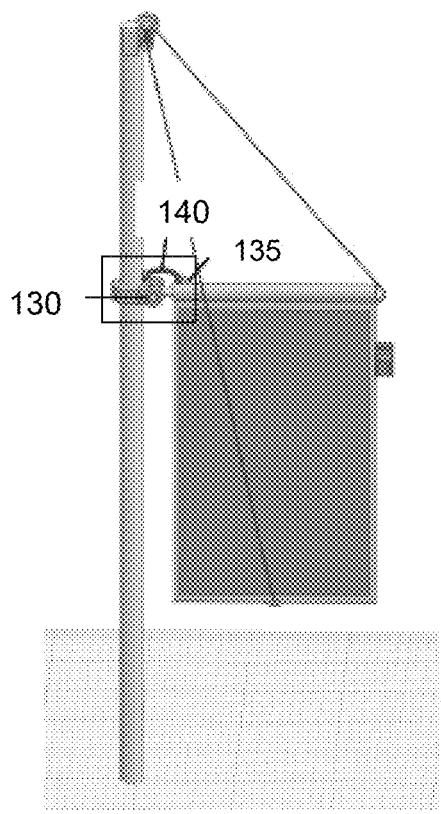
FIG. 30a illustrates a panel mount angled down with the top edge kept even with ground in accordance with some embodiments of the presently disclosed subject matter.
Figure 30B:
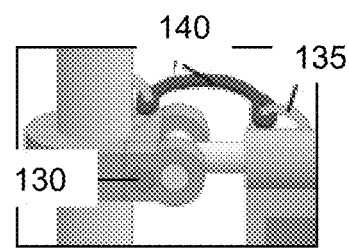
FIG. 30b is an inset of FIG. 30a provided for better visibility of the panel mount.
Figure 30C:
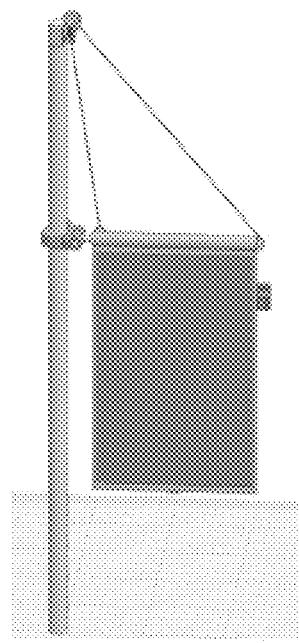
FIG. 30c illustrates removal of safety attachments, and a tensile element is moved to support the top edge of panel in accordance with some embodiments of the presently disclosed subject matter.

Overhead suspension of solar collector 20 offers the unique ability to rapidly dismount the system. Several additional features can facilitate the process. For example, any cables or other elements that prevent central cylinder 30 from sliding off shaft 50 can be easily detachable. Similarly, safety attachments that secure the panel mount to the vertical structure can also be easily detachable. The panel mount can be configured to detach from vertical support structure 10 at any location. The vertical support attachment, supporting pivot, shaft, central cylinder and/or panel can uncouple from the vertical support structure using any suitable method. For example, in some embodiments, a detachable supporting pivot 130 can be used, as shown in FIGS. 30a-30c. The system can also include dismount attachment 135 positioned near the pivot on the top portion of the removed section, as shown. The overhead attachment point can be positioned directly above the dismount attachment in some embodiments.

Figures 30D, 30E:
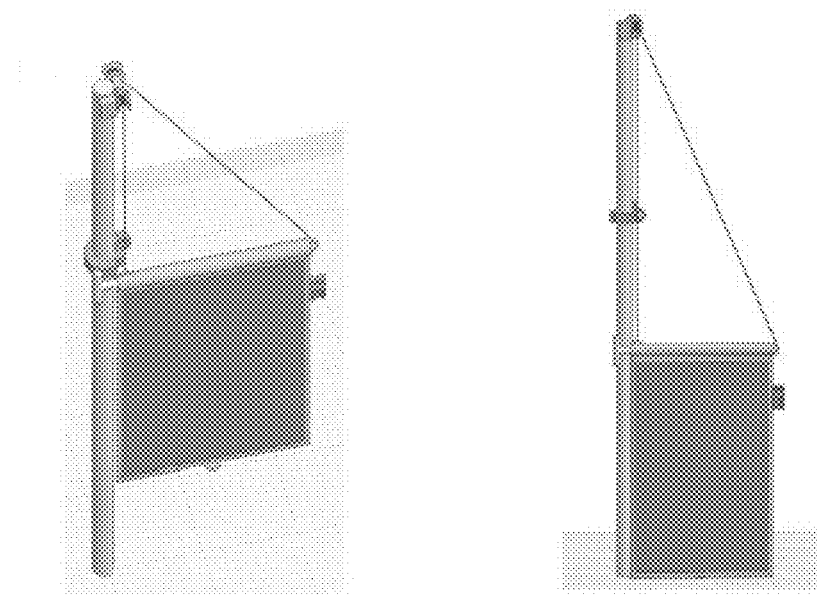
FIG. 30d illustrates disconnection of a pivot from a support attachment in accordance with some embodiments of the presently disclosed subject matter.
FIG. 30e illustrates lowering of amount to the ground in accordance with some embodiments of the presently disclosed subject matter.
Figure 31:
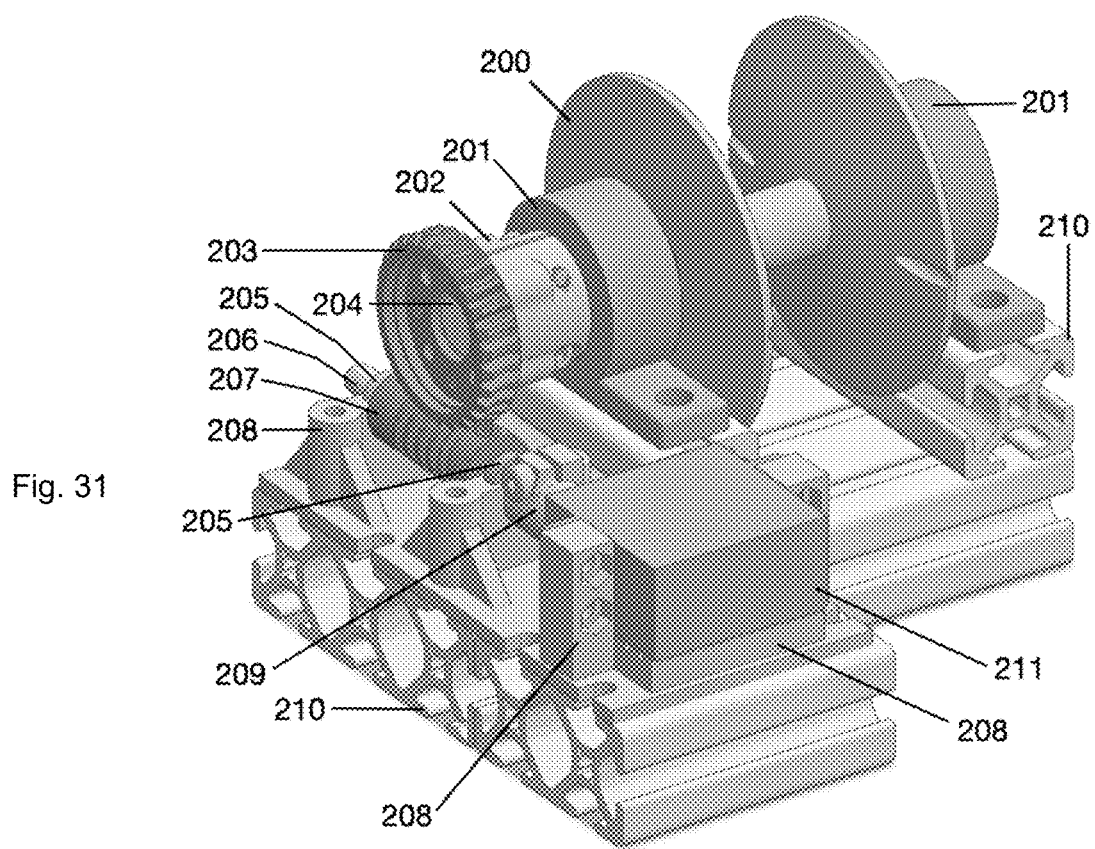
FIG. 31 is an illustration of a worm gear in accordance with some embodiments of the presently disclosed subject matter.

To dismount panel mount 55, one side of the panel mount can be lowered with the top edge of the panel mount kept at the desired angle for lowering (e.g., parallel to the ground in some embodiments), as shown in FIG. 30a. The tensile element attaching to the bottom edge of the panel mount can then be moved either manually or via an automatic mechanism to the dismount attachment point, as illustrated in FIG. 30c. If the tensile actuator is overhead, only the connection to the panel mount needs to be moved. However, if the tensile actuator is located on the panel mount itself, the actuator should either be moved or have its force redirected such that it comes from the dismount attachment point. Any safety cable 140 connecting to the supporting structure should be removed. Next, the detachable supporting pivot (or alternative junction point) should be uncoupled from the vertical support attachment, as shown in FIG. 30d. Both tensile elements can then be raised in unison slightly, allowing the panel to come free from the vertical support structure. In some embodiments, extension and retraction of the tensile elements are enabled in tandem such that the top edge of the panel mount is kept at the same angle. Accelerometers and/or feedback mechanisms (e.g., rotary encoders) can be used to calculate the correct amount of movement to apply to each tensile element. Once clear of the former connection point, the panel can be lowered on its edge, as shown in FIG. 30e. The panel mount can then be secured to the ground or have its tensile elements detached and be removed. By following these steps in reverse order, the panel mount can be reattached.

In some embodiments, a simpler method can be employed if the goal is to secure the panel mount to the ground, and the end of the central cylinder when pointing down is not far from the ground. Specifically, the central cylinder can be lowered by fully extending the attached tensile element (i.e., the tensile element that causes rotation along the supporting pivot). The other tensile element can then be detached. Next, the central cylinder can be uncoupled from the shaft, lowered to the ground via the connected tensile element, and secured to the ground via cables pins or other elements. The panel can be covered to protect it from the elements and to further secure the device.

Figure 5A:
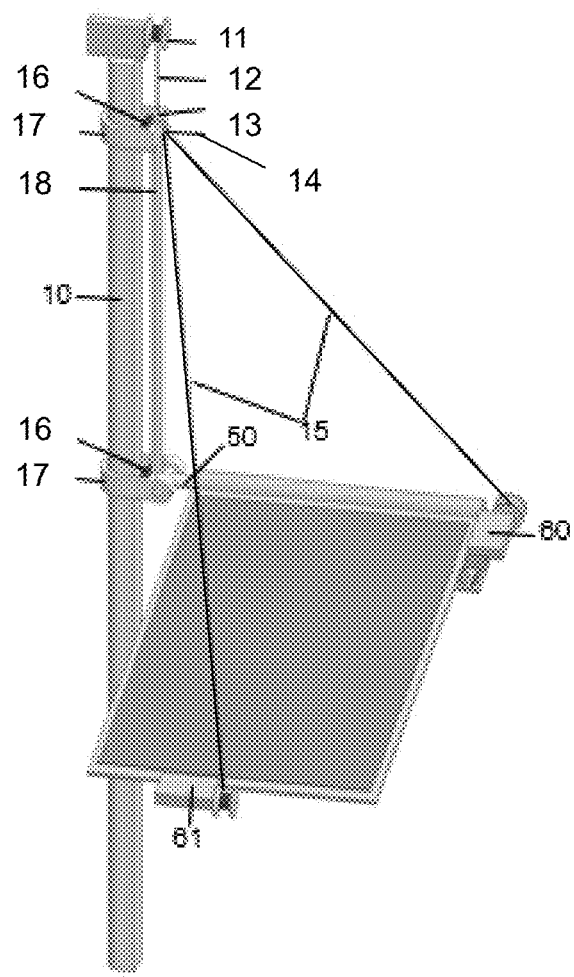
FIG. 5a illustrates a system comprising a height-adjustable solar collector in accordance with some embodiments of the presently disclosed subject matter.
Figure 5B:
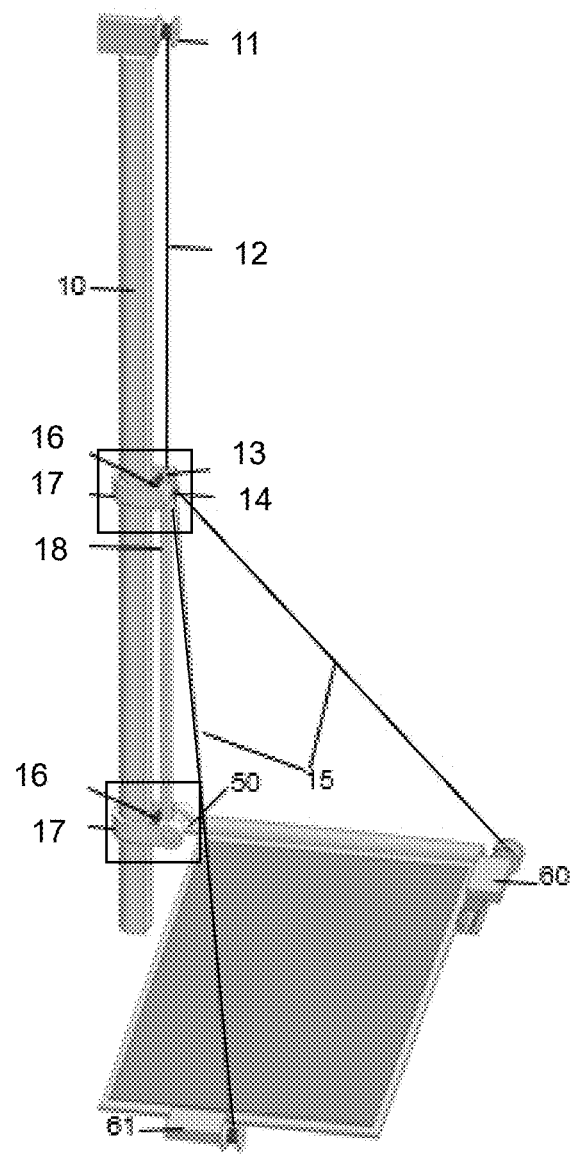
FIG. 5b illustrates a system comprising a height-adjustable solar collector in accordance with some embodiments of the presently disclosed subject matter.
Figure 5C:
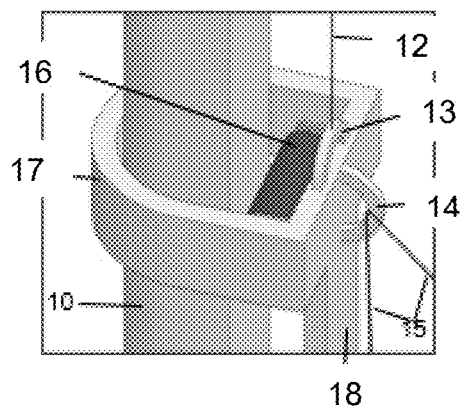
FIG. 5c is a fragmentary view illustrating a travel mechanism in accordance with some embodiments of the presently disclosed subject matter.
Figure 5D:
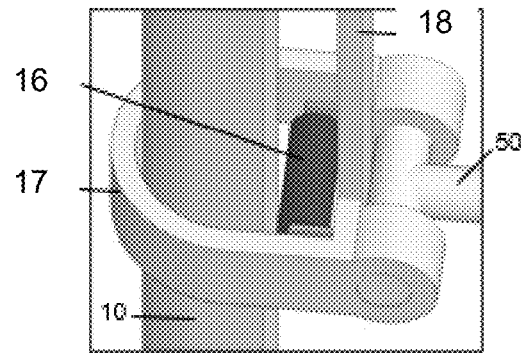
FIG. 5d is a fragmentary view illustrating a travel mechanism in accordance with some embodiments of the presently disclosed subject matter.

Alternatively, the system can be lowered by a third actuator that raises and lowers the attachment to the vertical support 10, as shown in FIGS. 5a and 5b.

Adding another tensile element and actuator serves as an alternative to moving an existing attachment point or tensile actuator.

Ultimately, the overhead suspension of the panels allows the solar collector to be secured and transported much easier than existing fixed panels and/or solar tracking systems.

The disclosed system offers many advantages over prior art solar tracking systems. For example, system 5 includes reduced mechanical complexity and cost by eliminating robust motors traditionally required to bear the weight of solar-collecting elements.

The disclosed system further offers increased adaptability for installations in constrained spaces or on existing structures.

System 5 includes a simplified setup, requiring only the attachment of tensile elements to a vertical structure (e.g., utility pole or the underside of a roof) and a support mount for the rotatable cylinder attached to the solar-collecting element.

Further, system 5 offers advantages in terms of component cost, system footprint, quick dismount capability and exposure of bifacial solar collecting panels.

The system can also be used to collect or signals from other celestial bodies or man-made objects and provides features for increased security, remote control, and emergency responsiveness.

The disclosed system is compatible with other solar-collecting elements, such as solar thermal systems and heliostat mirrors.

The system includes enhanced energy harvest due to unobstructed exposure of the panel's underside, enabling bifacial light collection.

In various embodiments, multiple tensile elements and actuating mechanisms can be strategically placed to accommodate different orientations and installation locations, including residential settings, utility poles, parking lots, and even trees.

The system can include easy dismounting for stowage during storms or transferring to new locations, allowing owners to take their solar investment with them should they move.

The disclosed system further aims to address the limitations of existing solar tracking systems and offers a cost-effective, efficient, and versatile alternative.

Although the presently disclosed subject matter has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims

What is claimed is:

1. A system for manipulating a solar collector through overhead tensile actuation, the system comprising:
    a vertical structure for support;
    a supporting panel mount or supporting frame to hold the solar collector;
    at least two tensile actuators configured to apply tensile force to the solar collector from above a plane of the solar collector;
    a supporting pivot to angle the solar collector;
    a rotating central cylinder connected to the supporting pivot; and
    a control mechanism to manipulate the tensile actuators for rotational or angular movement of the solar collector;
    wherein the central cylinder is positioned along a side of the panel mount.

2. The system of claim 1, wherein the solar collector is selected from the group comprising solar panels, heliostats, solar thermal collectors, and combinations thereof.

3. The system of claim 1, wherein the tensile actuators are selected from the group comprising: cables, chains, ropes, strings, cords, wires, lashings, tethers, and combinations thereof.

4. The system of claim 1, wherein the tensile actuators are wound using one or more winding mechanism selected from winches, hoists, pulleys, ratchets, spools, and combinations thereof.

5. The system of claim 1, wherein the rotating central cylinder or supporting pivot is arranged to rotate to allow the solar collector to track either diurnal motion or seasonal declination.

6. The system of claim 1, wherein one or more attachments are positioned at any location along the solar collector, panel mount, or rotating central cylinder, provided that the vertical structure is not a centrally located structure under a plane of the panel mount and tensile force comes from above the plane of the panel mount.

7. The system of claim 1, wherein the tensile actuators are attached to the solar collector, the panel mount, an overhead attachment, a central shaft, the rotating central cylinder, the vertical support structure, or ground.

8. The system of claim 1, further comprising one or more rotational hinges, spacers, pulleys, eye screws, eye bolts, snatch blocks, springs, pivots, or bearing assemblies that allow the tensile actuators to align with a corresponding attachment.

9. The system of claim 1, further comprising elements to reduce back-drive of the tensile actuator, the elements selected from one or more of integrated brakes, worm gears, gear boxes, or mechanical breaks.

10. The system of claim 1, wherein the supporting pivot is raised and lowered by an additional tensile actuator for maintenance, optimal positioning, or emergency scenarios such as high winds.

11. The system of claim 1, wherein the shaft is connected to any point or points along the supporting pivot.

12. The system of claim 1, wherein the supporting pivot or vertical structure comprise hinges or bearing assemblies.

13. The system of claim 1, wherein multiple systems are attached to the same vertical structure and share control boards, local power sources, GPS units, communication systems, pivots, shafts, positional sensors, tensile actuators, tensile elements, or combinations thereof.

14. The system of claim 1, wherein the rotating central cylinder, supporting pivot, or both comprise rotational bearings.

15. The system of claim 1, wherein a shaft of the rotating cylinder is attached to the panel mount with the rotating cylinder attached to the supporting pivot.

16. The system of claim 1, wherein a pivot pin is attached to the vertical structure with the rotating central cylinder attached to the pivot pin.

17. The system of claim 1, further comprising a positioning sensor on the panel mount, an axle, an actuator, or a tensile element that provides feedback on the orientation of the solar collector, the positional sensor selected from one or more of an accelerometer, gyroscope, rotary encoder, or photodiode.

18. The system of claim 1, further comprising an alternative function where the system redirects, collects, receives, or sends emissions to or from a natural object such as a celestial body or manmade object selected from a satellite or weather balloon.

19. The system of claim 1, wherein the vertical structure rotates, adjusts, or both rotates and adjusts an angle of the vertical structure.

* * * * *